US008184827B2

(12) United States Patent
Yoshizawa et al.

(10) Patent No.: US 8,184,827 B2
(45) Date of Patent: May 22, 2012

(54) SOUND SOURCE POSITION DETECTOR

(75) Inventors: Shinichi Yoshizawa, Osaka (JP); Yoshihisa Nakatoh, Kyoto (JP)

(73) Assignee: Panasonic Corporation, Osaka (JP)

( * ) Notice: Subject to any disclaimer, the term of this patent is extended or adjusted under 35 U.S.C. 154(b) by 1035 days.

(21) Appl. No.: 12/094,724

(22) PCT Filed: Nov. 6, 2007

(86) PCT No.: PCT/JP2007/071524
§ 371 (c)(1),
(2), (4) Date: May 22, 2008

(87) PCT Pub. No.: WO2008/056649
PCT Pub. Date: May 15, 2008

(65) Prior Publication Data
US 2009/0285409 A1 Nov. 19, 2009

(30) Foreign Application Priority Data
Nov. 9, 2006 (JP) .................................. 2006-304507

(51) Int. Cl.
H04R 3/00 (2006.01)
(52) U.S. Cl. ....... 381/91; 381/92; 381/122; 379/202.01; 348/14.16; 348/E7.077; 348/E7.083
(58) Field of Classification Search .................... None
See application file for complete search history.

(56) References Cited

U.S. PATENT DOCUMENTS

| 2,496,031 A | * | 1/1950 | Anderson et al. ............. 367/126 |
| 3,794,766 A | * | 2/1974 | Cox et al. ........................ 381/66 |
| 4,283,767 A | | 8/1981 | Rountree |
| 5,581,620 A | * | 12/1996 | Brandstein et al. ............. 381/92 |
| 5,657,393 A | * | 8/1997 | Crow ............................... 381/92 |

(Continued)

FOREIGN PATENT DOCUMENTS

| JP | 5-85288 | 4/1993 |
| JP | 5-92767 | 12/1993 |

(Continued)

OTHER PUBLICATIONS

Supplementary European Search Report issued Nov. 6, 2009 in European Patent Application No. 07 83 1256.

(Continued)

Primary Examiner — Hrayr A Sayadian
(74) Attorney, Agent, or Firm — Wenderoth, Lind & Ponack, L.L.P.

(57) ABSTRACT

Provided is a sound source localization device which can detect a source location of an extraction sound, including at least two microphones; an analysis unit (103) which (i) analyze frequencies of the mixed sound including the noise and received by each microphone, and (ii) generates frequency signals; and an extraction unit (105) which, for each source location candidate, (a) adjusts time axes of the frequency signals corresponding to the microphones, so that there is no time difference between when the mixed sound reaches one microphone from the source location candidate and when the mixed sound reaches another microphone from the source location candidate, and (b) determines frequency signals having a difference distance equal to or smaller than a threshold value, from among the frequency signals corresponding to the microphones with the time axis having been adjusted, the difference distance representing a degree of a difference in the frequency signals between the microphones, and (c) extracts the source location of the extraction sound from among the source location candidates, in accordance with a degree of matching of the determined frequency signals between the microphones.

9 Claims, 28 Drawing Sheets

U.S. PATENT DOCUMENTS

| | | | |
|---|---|---|---|
| 5,778,082 A * | 7/1998 | Chu et al. | 381/92 |
| 6,069,961 A * | 5/2000 | Nakazawa | 381/92 |
| 6,130,949 A * | 10/2000 | Aoki et al. | 381/94.3 |
| 6,987,856 B1 | 1/2006 | Feng et al. | |
| 2001/0028720 A1* | 10/2001 | Hou | 381/92 |
| 2001/0033649 A1* | 10/2001 | Rogers | 379/388.01 |
| 2004/0001597 A1* | 1/2004 | Marton | 381/71.1 |
| 2005/0008169 A1* | 1/2005 | Muren et al. | 381/92 |
| 2005/0041529 A1 | 2/2005 | Schliep et al. | |
| 2005/0111674 A1* | 5/2005 | Hsu | 381/92 |
| 2005/0141735 A1* | 6/2005 | Kim | 381/313 |
| 2006/0045289 A1* | 3/2006 | Kujirai et al. | 381/92 |
| 2008/0181430 A1* | 7/2008 | Zhang et al. | 381/92 |

FOREIGN PATENT DOCUMENTS

| | | |
|---|---|---|
| JP | 6-83371 | 3/1994 |
| JP | 7-192183 | 7/1995 |
| JP | 10-313497 | 11/1998 |
| JP | 2000-98015 | 4/2000 |
| JP | 2000-99853 | 4/2000 |
| JP | 2000-105274 | 4/2000 |
| JP | 2000-111633 | 4/2000 |
| JP | 2000-121719 | 4/2000 |
| JP | 2004-537057 | 12/2004 |

OTHER PUBLICATIONS

International Search Report issued Dec. 18, 2007 in the International (PCT) Application of which the present application is the U.S. National Stage.

* cited by examiner

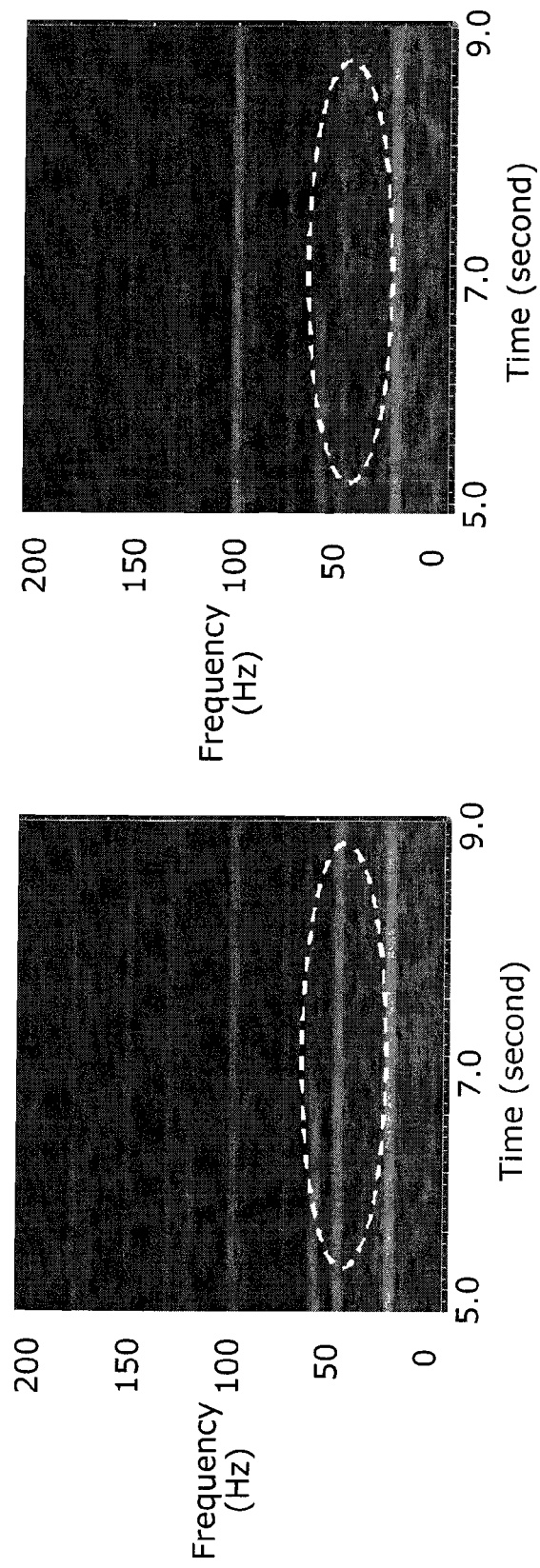

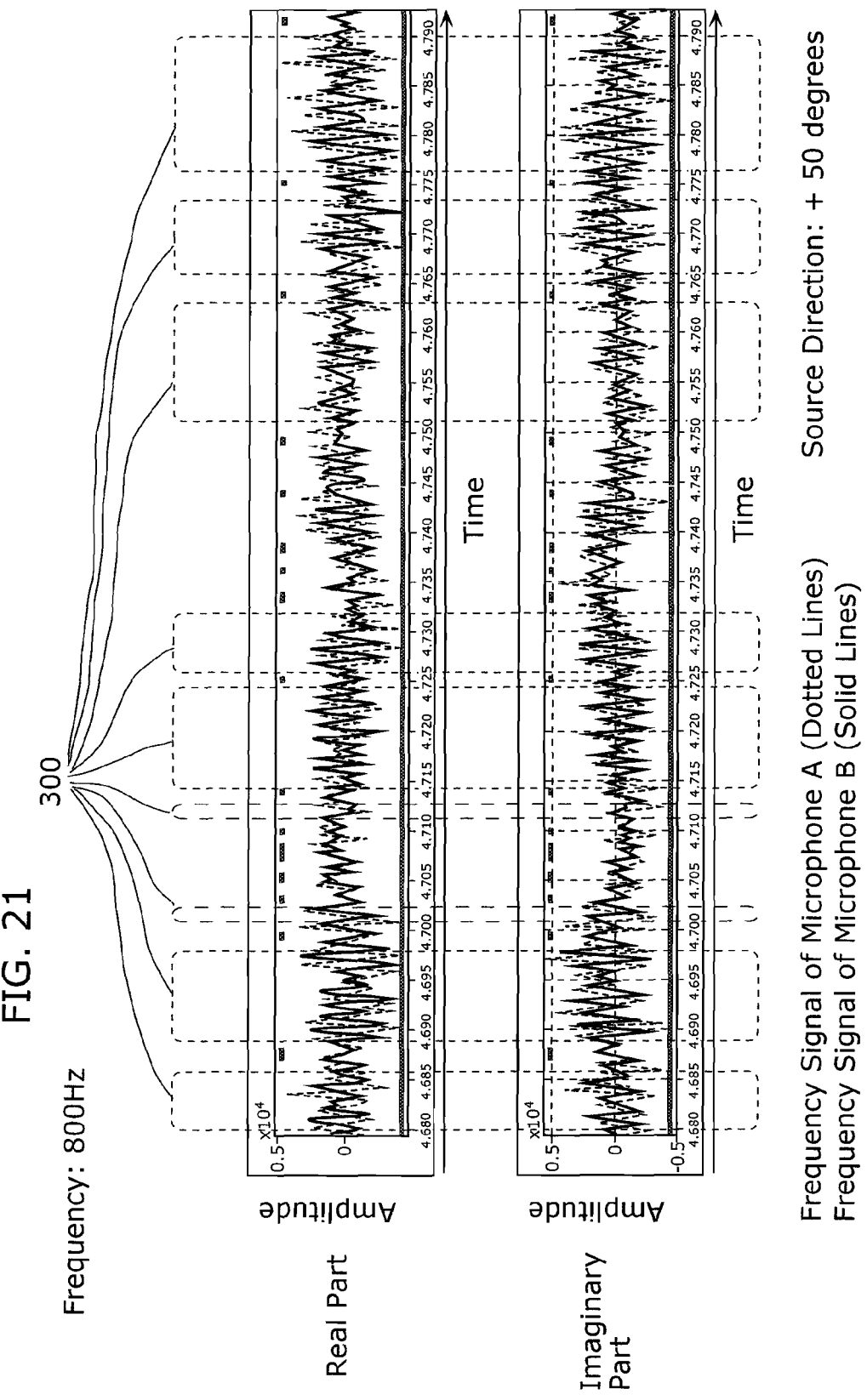

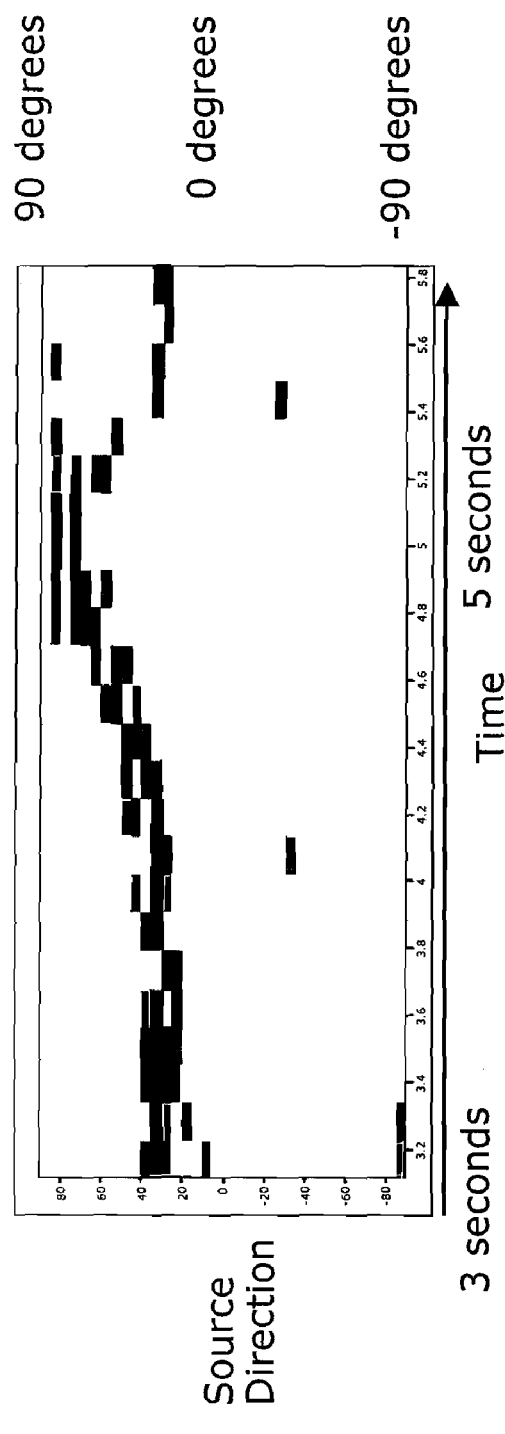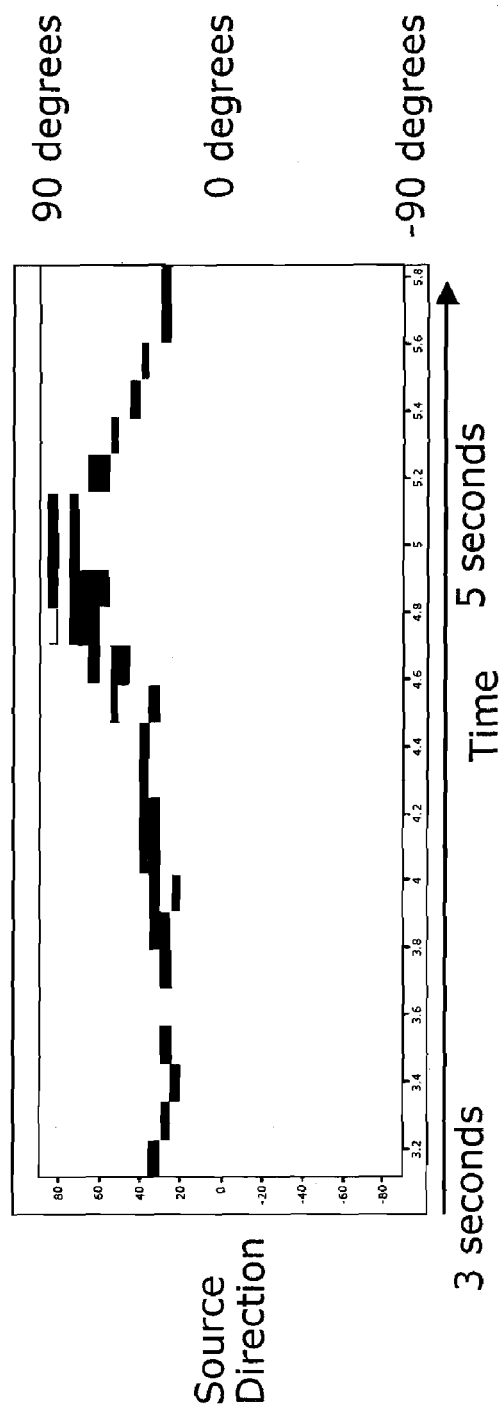
FIG. 28A
FIG. 28B

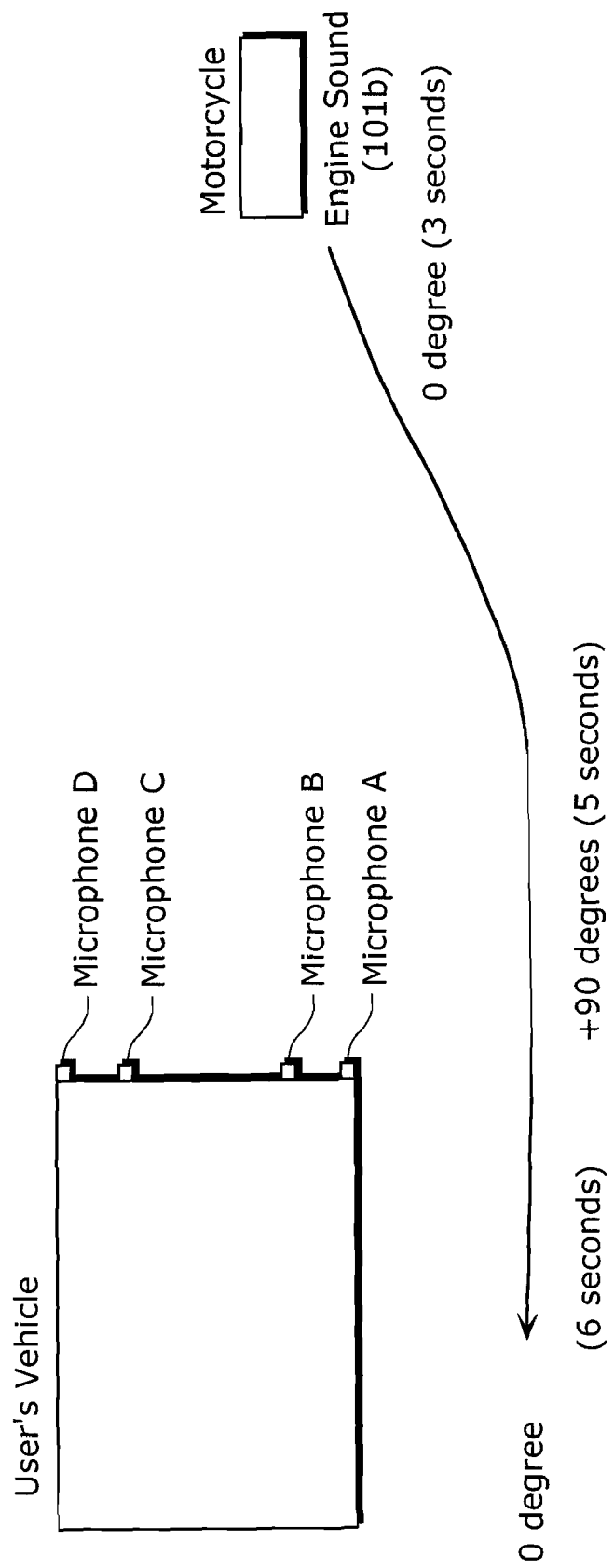

SOUND SOURCE POSITION DETECTOR

TECHNICAL FIELD

The present invention relates to sound source localization devices, sound source localization methods, and programs, by which a direction or location of a source of a sound except a predetermined noise is detected by removing influence of the predetermined noise. More particularly, the present invention relates to an on-vehicle sound source localization device which detects a direction or location of a sound source of a vehicle near a user's vehicle by removing influence of an engine sound produced by the user's vehicle.

BACKGROUND ART

The first example of prior arts relates to a technology of detecting a location of a sound source (hereinafter, referred to also as a "source location"). In the first example of prior arts, it has proposed that sound signals which a plurality of microphones receive are delayed one by one to be convoluted, then a two power of an error among the delayed sound signals is calculated, and eventually a direction of a sound source (hereinafter, referred to also as a "source direction") of the sound signals is determined from a delay amount having a minimum value of the two power of the error (refer to Patent Reference 1, for example).

The second example of prior arts relates to a technology of detecting a source location of an extraction sound which is extracted from a mixed sound including a noise. In the second example of prior arts, it has proposed that the number of engine rotations of an engine sound of a user's vehicle is detected, then a fundamental wave component and harmonic wave components related to the number of engine rations are removed, and thereby the influence of the engine sound produced by the user's vehicle is reduced (refer to Patent Reference 2, for example).

FIG. 1 shows graphs for explaining a method of removing an engine sound of a user's vehicle according to the second example of prior arts.

In the second example of prior arts, firstly, a fundamental wave component fkHz of the engine sound is determined using a sensor which detects the number of engine rotations of the user's vehicle. Next, using the fundamental wave component fkHz, harmonic wave components 2fkHz, 3fkHz, . . . of the engine sound are determined. FIG. 1 (*a*) shows frequency signals having a waveform of a sound collected by an acoustic microphone. Then, a horizontal axis represents a frequency, and a vertical axis represents a signal level. Here, signals in frequency bands of the previously determined fundamental wave component fkHz and harmonic wave components 2fkHz, 3fkHz, . . . (refer to FIG. 1 (*b*)) are removed from the frequency signals of FIG. 1 (*a*). As a result, as shown in FIG. 1 (*c*), it is possible to obtain frequency signals from which the signals in frequency bands of the fundamental wave component fkHz and the harmonic wave components 2fkHz, 3fkHz, . . . of the engine sound are removed. Using the frequency signals obtained after the removing, a source location of a vehicle near the user's vehicle is determined.

[Patent Reference 1] Japanese Unexamined Patent Application Publication No. 6-83371 (Claim 2)

[Patent Reference 2] Japanese Unexamined Patent Application Publication No. 5-85288 (Claim 2, FIG. 4)

SUMMARY OF THE INVENTION

Problems that Invention is to Solve

However, the first example of prior arts has a problem of difficulty in the detecting of a source location of an extraction sound to be extracted, from among a mixed sound including a noise, because there is no means for distinguish the extraction sound over the mixed sound.

Moreover, the second example of prior arts also has a problem. The feature of the second example is merely removing of signals in frequency ranges of a fundamental wave component and harmonic wave components of an engine sound which are determined from the number of engine rotations. Therefore, the second example of prior arts fails to completely remove influence of the engine sound produced by the user's vehicle. This problem is explained in more detail below.

FIG. 2 is a spectrogram of an engine sound (idling sound) of a user's vehicle which a microphone mounted on the user's vehicle receives. In this spectrogram, a vertical axis represents a frequency, and a horizontal axis represents a time. Further, in this spectrogram, a paler color part has a higher sound pressure sensitivity level (signal level), and a darker color part has a lower sound pressure sensitivity level.

According to the spectrogram of FIG. 2, it is understood that signal components exist also in other frequency bands, and it is not that only fundamental wave component and harmonic wave components of the engine sound simply exist in the spectrogram. One of the reasons would be that a waveform of the engine sound is distorted by influence of a hood of the vehicle, while the engine sound travels from an engine compartment to a microphone. As explained above, the second example of prior arts fails to completely remove the influence of the engine sound produced by the user's vehicle only by simply removing a fundamental wave component and harmonic wave components of the engine sound. For the sake of easy understanding of the spectrogram, FIG. 3 shows binarized data of values of shading in the spectrogram of FIG. 2.

In order to address the above problems, an object of the present invention is to provide a sound source localization device and the like which can detect a source direction or a source location of a sound except a predetermined noise by removing influence of the predetermined noise.

More specifically, an object of the present invention is to provide an on-vehicle sound source localization device and the like by which a source direction or a source location of a vehicle near a user's vehicle can be detected by removing influence of an engine sound produced by the user's vehicle.

Means to Solve the Problems

In accordance with an aspect of the present invention for achieving the above objects, there is provided a sound source localization device which detects, from a mixed sound including a noise, a source direction or a source location of an extraction sound to be extracted from the mixed sound, the sound source localization device including: an analysis unit operable to (i) analyze frequencies of the mixed sound including the noise, and (ii) thereby generate frequency signals, the mixed sound being received by each of a plurality of microphones which are arranged apart from each other; and an extraction unit operable to: for each of a plurality of candidates for the source direction or the source location, (a) adjust time axes of the frequency signals corresponding to the plurality of microphones, so that there is no time difference between when the mixed sound reaches one of the plurality of microphones from the candidate for the source direction or the source location and when the mixed sound reaches another one of the plurality of microphones from the candidate for the source direction or the source location, and (b) determine frequency signals having a difference distance equal to or smaller than a threshold value, from among the frequency signals corresponding to the plurality of microphones with the time axis having been adjusted, the difference distance representing a degree of a difference in the frequency signals between the plurality of microphones, and (c) extract the source direction or the source location of the extraction sound from among the plurality of candidates for the source direction or the source location, in accordance with a degree of matching of the determined frequency signals between the plurality of microphones; wherein, when the plurality of microphones receive the extraction sound, the threshold value is determined so that the difference distance between the plurality of microphones becomes equal to or smaller than the threshold value, the difference distance being regarding the frequency signals generated by analyzing a frequency of the extraction sound, and when the plurality of microphones receive a predetermined noise which is included in the noise and is to be removed, the threshold value is determined so that the difference distance between the plurality of microphones becomes greater than the threshold value, the difference distance being regarding the frequency signals generated by analyzing a frequency of the predetermined noise.

With the above structure, a difference distance among the microphones is compared with a threshold value to determine a size of the difference distance (hereinafter, this processing is referred to also as "threshold value processing"). Thereby, it is possible to distinguish (i) the noise to be removed from the mixed sound over (ii) the extraction sound to be extracted from the mixed sound. Therefore, parts of frequency signals corresponding to the noise can be selectively removed from frequency signals of the mixed sound which the microphones receive. As a result, the sound source localization device according to the present invention can detect a direction or a location of a sound source of the extraction sound, by removing influence of the noise.

FIG. 4A shows one example of a spectrogram of a noise (an engine sound of the user's vehicle) regarding the microphones. FIG. 4B shows one example of frequency signals (power spectrums) of the noise regarding the microphones. Moreover, FIG. 5A shows a spectrogram of an extraction sound (a sound of a motorcycle near the user's vehicle) regarding the microphones. Each of FIGS. 5B and 5C shows one example of frequency signals (power spectrums) of the extracted sound regarding the microphones. The microphones are mounted on the left side and on the right side, respectively, of a front bumper of the user's vehicle.

Each of FIGS. 4A and 5A shows a spectrogram where a vertical axis represents a frequency and a horizontal axis represents a time. In each spectrogram, a paler color part has a higher sound pressure sensitivity level (signal level), and a darker color part has a lower sound pressure sensitivity level. Each of FIGS. 4B, 5B, and 5C shows power spectrums where a vertical axis represents a power spectrum and a horizontal axis represents a frequency. In each of these figures, each of two solid lines is a power spectrum of a corresponding one of the microphones.

FIG. 4B shows power spectrums at a time A of FIG. 4A. Here, each of a frequency A1 and a frequency A2 has a noise (an engine sound of the user's vehicle). It is seen in FIG. 4B that, for each of the frequency A1 and the frequency A2, a value of a power spectrum corresponding to one of the microphones is significantly different from a value of a power spectrum corresponding to the other microphone. Furthermore, FIG. 5B shows power spectrums at a time B of FIG. 4A (where the motorcycle is located 40 m far from the user's vehicle). Here, each of a frequency B1 and a frequency B2 has an extraction sound (a sound produced by the motorcycle near the user's vehicle). It is seen in FIG. 5B that, for each of the frequency B1 and the frequency B2, a value of a power spectrum corresponding to one of the microphones is almost the same as a value of a power spectrum corresponding to the other microphone. Still further, FIG. 5C shows power spectrums at a time C of FIG. 5A (where the motorcycle is located 10 m far from the user's vehicle). Here, each of a frequency C1 and a frequency C2 has an extraction sound (a sound produced by the motorcycle near the user's vehicle). It is seen in FIG. 5C that, for each of the frequency C1 and the frequency C2, a value of a power spectrum corresponding to one of the microphones is almost the same as a value of a power spectrum corresponding to the other microphone. From the above facts, it is understood that the noise can be distinguished from the extraction sound, by comparing a difference distance between the microphones is compared with a threshold value to determine a size of the difference distance. In the above case, since the noise is an engine sound produced by the user's vehicle, the noises which the microphones mounted on the user's vehicle receive have respective different frequencies, resulting from influence of a hood, a difference in propagation distances, and the like. As a result, the difference distance between the microphones is increased. On the other hand, since the extraction sound is a sound produced by the motorcycle which locates far from the microphones of the user's vehicle. A distance between the motorcycle and each of the microphones does not significantly differ among the respective microphones. Therefore, a sound pressure sensitivity level resulting from distance-related attenuation is not so varied among the microphones. Moreover, since the sound produced by the motorcycle propagates in air, the sound is less distorted during the propagation. Thus, from the motorcycle, the respective microphones receive sounds having similar frequency signals. As a result, the difference distance between the microphones is reduced.

Moreover, regarding parts of power spectrums corresponding to background noises, which are enclosed by dashed lines in FIGS. 5B and 5C, it is understood that a value of one of the microphones is significantly different from a value of the other microphone. From the fact, it is understood that a part of a background noise can be removed as a noise.

It is preferable that the plurality of microphones are arranged so that a ratio is greater than another ratio, the ratio being calculated by dividing a longer distance by a shorter distance among distances between a source location of the noise and the respective plurality of microphones, and the another ratio being calculated by dividing a longer distance by a shorter distance among distances between the source location of the extraction sound and the respective plurality of microphones.

With the above structure, in the sound source localization device according to the present invention, a degree of a difference among the microphones regarding frequency signals (power spectrums) of the noise is able to set to be greater than a degree of a difference among the microphones regarding frequency signals (power spectrums) of the extraction sound (since, if a sound source is located far, a degree of a difference among the microphones regarding frequency signals of the sound source can be considered approximately 0). This is based on technological observations that a sound pressure sensitivity level is attenuated in inverse proportion to a distance from a sound source (or a two power of the distance). This can apply for the case where an extraction sound traveling from a far location is detected by microphones which are located near a sound source of a noise but arranged to be have different distances from the sound source of the noise, respectively (Here, a ratio of (i) a distance between the sound source of the noise and one microphone to (ii) a distance between the sound source of the noise and another microphone is greater than 1). This is because a ratio of (i) a distance between the far sound source of the extraction sound and one microphone to (ii) a distance between the far sound source of the extraction sound and another microphone can be considered to be approximately 1.

It is further preferable that a part of a transmission medium through which the noise propagates to corresponding one of the plurality of microphones is made of a material having a transmission characteristic which is different for each of the plurality of microphones.

With the above structure, in the sound source localization device according to the present invention, it is possible to increase a degree of a difference among the microphones regarding frequency signals (power spectrums or phase spectrums) of the noise. Thereby, the sound source localization device according to the present invention can easily set the threshold value. For example, by arranging materials having different attenuation rates of a sound pressure sensitivity level between the sound source of the noise and the microphones, respectively, it is possible to increase a degree of a difference among the microphones regarding frequency signals (power spectrums) of the noise. For example, the above can be achieved by arranging a metal and a plastic which have different density between the sound source of the noise and the microphones, respectively. Furthermore, by arranging materials having different phase characteristics between the sound source of the noise and the respective microphones, it is possible to increase a degree of a difference among the microphones regarding frequency signals (phase spectrums) of the noise.

It is still further preferable that the difference distance represents a degree of a difference in power spectrums of the frequency signals between the plurality of microphones.

With the above structure, in the sound source localization device according to the present invention, when an extraction sound traveling from a far location is detected by microphones which are located near a sound source of a noise but arranged to be have different distances from the sound source of the noise, it is possible to directly determine a degree of a difference among the microphones regarding pressure sensitivity levels based on the technological observations that a sound pressure sensitivity level is attenuated in inverse proportion to a distance from a sound source (or a two power of the distance). Furthermore, even when materials having different attenuation rates of a sound pressure sensitivity level are arranged between the sound source of the noise and the respective microphones, it is possible to directly determine a degree of a difference among the microphones regarding sound pressure sensitivity levels.

It is still further preferable that the difference distance is calculated for a predetermined time duration.

With the above structure, the sound source localization device according to the present invention can remove a part where frequency signals are the same among the microphones during a short time period by coincidence. FIG. 6 shows respective frequency signals (complex spectrums) each having a frequency of 800 Hz, regarding two microphones. In FIG. 6, each dotted line represents frequency signals regarding a microphone A, and each solid line represents frequency signals regarding a microphone B. In this figure, since the frequency signals are complex spectrums, a real part and an imaginary part of the frequency signals are plotted by separate graphs. This example shows a result in the case where a candidate for a source direction is +30 degrees. A part 602 enclosed by a broken line shows frequency signals having a small difference distance between the microphones regarding complex spaces at each predetermined time. As shown in FIG. 6, when a difference distance is calculated at each predetermined time, it is impossible to remove only a part where frequency signals are the same between the both microphones during a short time period by coincidence. However, if the difference distance is calculated for each time period, it is possible to remove only a part where frequency signals are the same between the both microphones during a short time period by coincidence.

It is still further preferable that the difference distance represents a degree of a difference in the frequency signals between the plurality of microphones, frequency signals being normalized using an average value of power spectrums of the plurality of microphones' frequency signals.

With the above structure, the difference distance among the microphones does not depend on a sound pressure sensitivity level, so that the sound source localization device according to the present invention can easily set the threshold value. For example, it is possible to easily set such a threshold value in consideration of both of an extraction sound having a high sound pressure sensitivity level and an extraction sound having a low sound pressure sensitivity level.

In accordance with another aspect of the present invention for achieving the above objects, there is provided a sound source localization device which detects, from a mixed sound including a noise produced by a user's vehicle, a source direction or a source location of a sound produced by a vehicle near the user's vehicle, the sound source localization device including: an analysis unit operable to (i) analyze frequencies of the mixed sound including the noise, and (ii) thereby generate frequency signals, the mixed sound being received by each of a plurality of microphones which are arranged apart from each other in the user's vehicle; and an extraction unit operable to: for each of a plurality of candidates for the source direction or the source location of the sound produced by the vehicle near the user's vehicle, (a) adjust time axes of the frequency signals corresponding to the plurality of microphones, so that there is no time difference between when the mixed sound reaches one of the plurality of microphones from the candidate for the source direction or the source location and when the mixed sound reaches another one of the plurality of microphones from the candidate for the source direction or the source location; and (b) determine frequency signals having a difference distance equal to or smaller than a threshold value, from among the frequency signals corresponding to the plurality of microphones with the time axis having been adjusted, the difference distance representing a degree of a difference in the frequency signals between the plurality of microphones, and (c) extract the source direction or the source location of the extraction sound from among the plurality of candidates for the source direction or the source location, in accordance with a degree of matching of the determined frequency signals between the plurality of microphones; wherein, when the plurality of microphones receive the sound produced by the vehicle near the user's vehicle, the threshold value is determined so that the difference distance between the plurality of microphones becomes equal to or smaller than the threshold value, the difference distance being regarding the frequency signals generated by analyzing a frequency of the sound, and wherein, when the plurality of microphones receive the noise produced by the user's vehicle, the threshold value is determined so that the difference distance between the plurality of microphones becomes greater than the threshold value, the difference distance being regarding the frequency signals generated by analyzing a frequency of the noise.

With the above structure, a difference distance among the microphones is compared with a threshold value to determine a size of the difference distance (hereinafter, this processing is referred to also as "threshold value processing"). Thereby, it is possible to distinguish (i) the noise produced by the user's vehicle over (ii) the sound produced by a vehicle near the user's vehicle. Therefore, parts of frequency signals corresponding to the noise can be selectively removed from frequency signals of the mixed sound which the microphones receive. As a result, the sound source localization device according to the present invention can detect a direction or a location of a sound source of the vehicle near the user's vehicle, by removing influence of the noise produced by the user's vehicle (engine sound of the user's vehicle, for example). For example, in the user's vehicle, a hood positioned between an engine of the user's vehicle and the microphones is made of various materials having different density or different shapes, so that different materials exist between the engine and the respective microphones. Thereby, among the microphones, it is possible to increase a difference distance in frequency signals of the sound produced by the engine. Furthermore, it is also possible that the microphones are embedded in a bumper of the user's vehicle, and that a joint part (a part of the microphone, except a part protruding from a body of the user's vehicle) between each microphone and the bumper is made of a material which has different transmission characteristics among the microphones. Thereby, among the microphones, it is possible to increase a difference distance in frequency signals of the sound produced by the engine. As a result, the sound source localization device according to the present invention can easily set the threshold value.

It should be noted that the present invention can be realized not only as the sound source localization devices including the above characteristic units, but also as: a sound source localization method including steps performed by the characteristic units of the sound source localization devices; a program causing a computer to execute the characteristic steps of the sound source localization method; and the like. Obviously, the program can be distributed by a recording medium such as a Compact Disc-Read Only Memory (CD-ROM) or by a communication network such as the Internet.

Effects of the Invention

Thus, the present invention can distinguish a noise to be removed over an extraction sound to be extracted, by comparing a difference distance among microphones with a threshold value to determine a size of the difference distance. Therefore, parts of frequency signals corresponding to the noise can be selectively removed from frequency signals of the mixed sound which the microphones receive. Thereby, the present invention can detect a direction and a location of a sound source of the extraction sound by removing influence of the noise. Especially, the present invention has significant advantages of removing influence of an engine sound produced by a user's vehicle, because the influence of the engine sound causes a problem when the microphones on the user's vehicle operate to achieve the detecting.

BRIEF DESCRIPTION OF DRAWINGS

FIG. 11A is a graph showing a spectrogram of an engine sound of a user's vehicle.

FIG. 11B is a graph showing another spectrogram of the engine sound produced by the user's vehicle.

FIG. 21 shows graphs of one example of frequency signals of a mixed sound.

FIG. 28A is a graph showing values of shading in the graph of FIG. 27A as binarized data.

FIG. 28B is a graph showing values of shading in the graph of FIG. 27B as binarized data.

FIG. 29 is a diagram showing a source location of an engine sound of a motorcycle.

| Numerical References | |
|---|---|
| 100 | sound source localization device |
| 101a | engine sound of a user's vehicle |
| 101b | engine sound of a motorcycle |
| 102a to 102n | microphone |
| 103 | analysis unit |
| 104 | threshold value |
| 105 | extraction unit |

DETAILED DESCRIPTION OF THE INVENTION

The following describes a preferred embodiment of the present invention with reference to the drawings.

Figure 1:
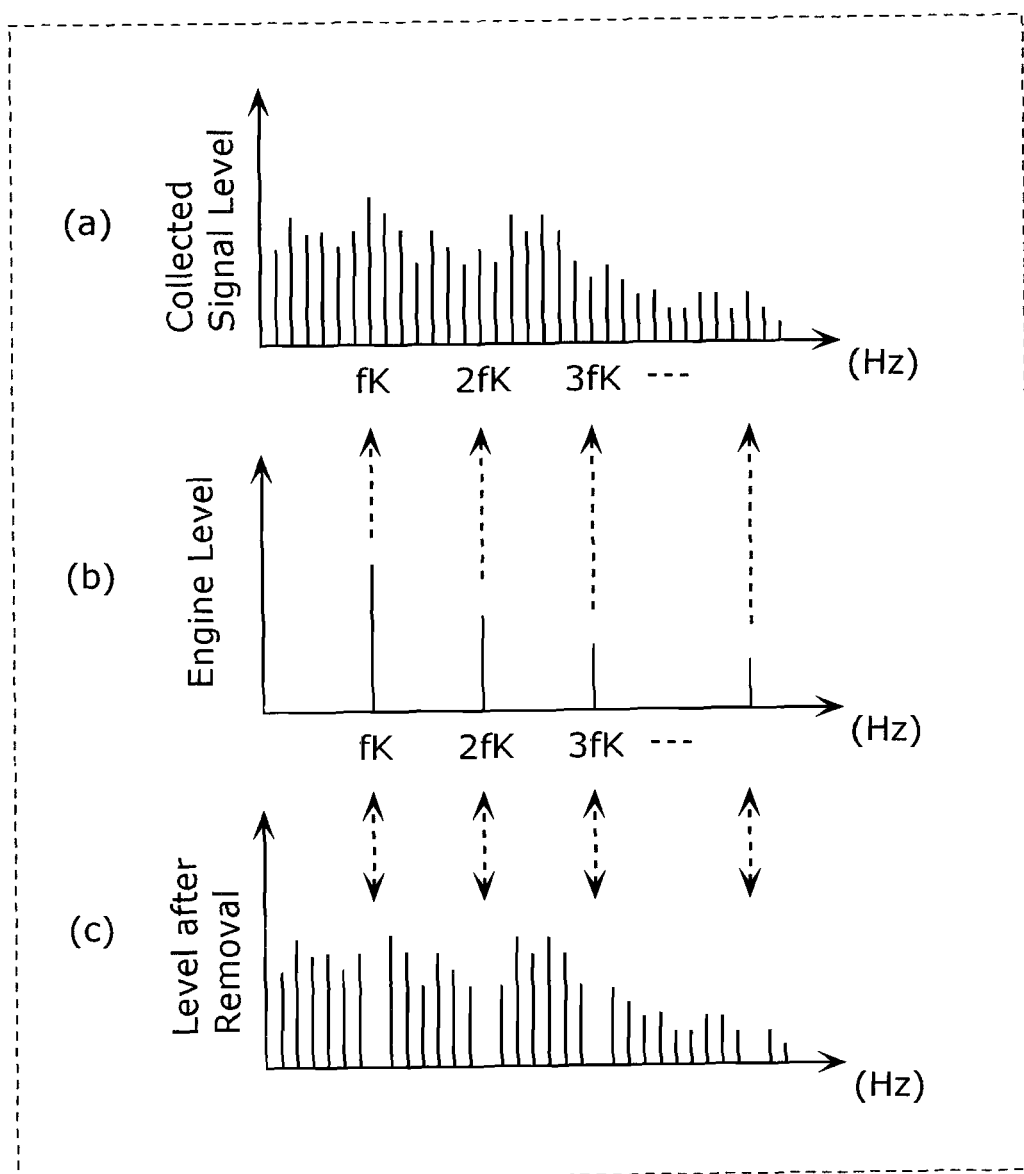
FIG. 1 shows graphs for explaining a method of removing an engine sound according to the prior art.
Figure 2:
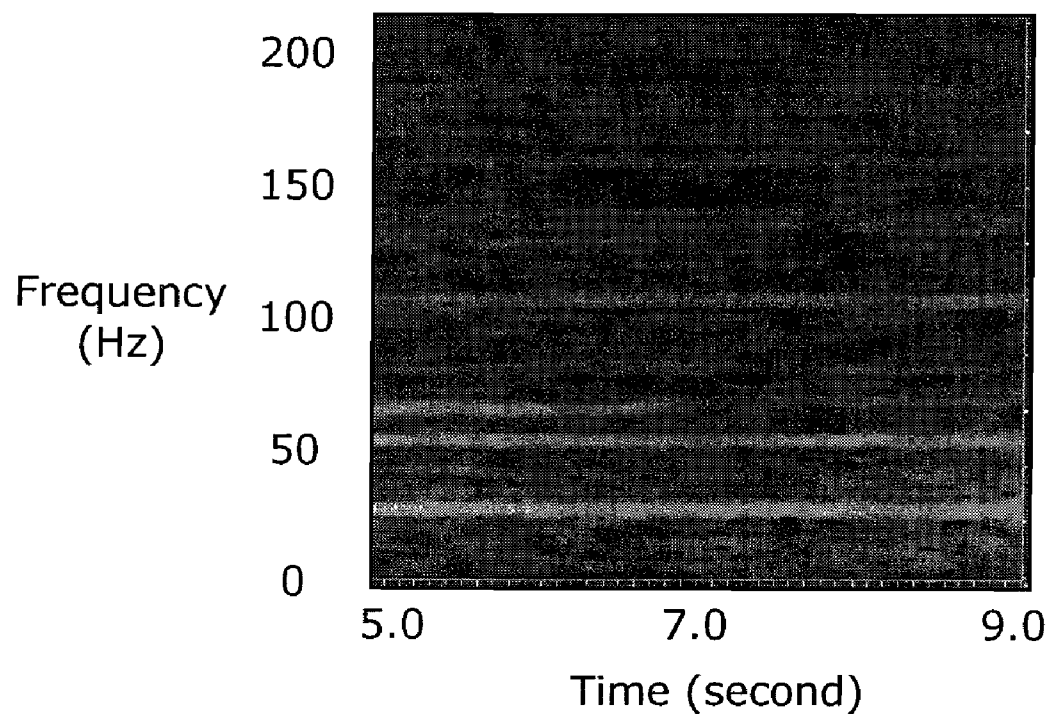
FIG. 2 is a graph showing a spectrogram of an engine sound of a user's vehicle.
Figure 3:
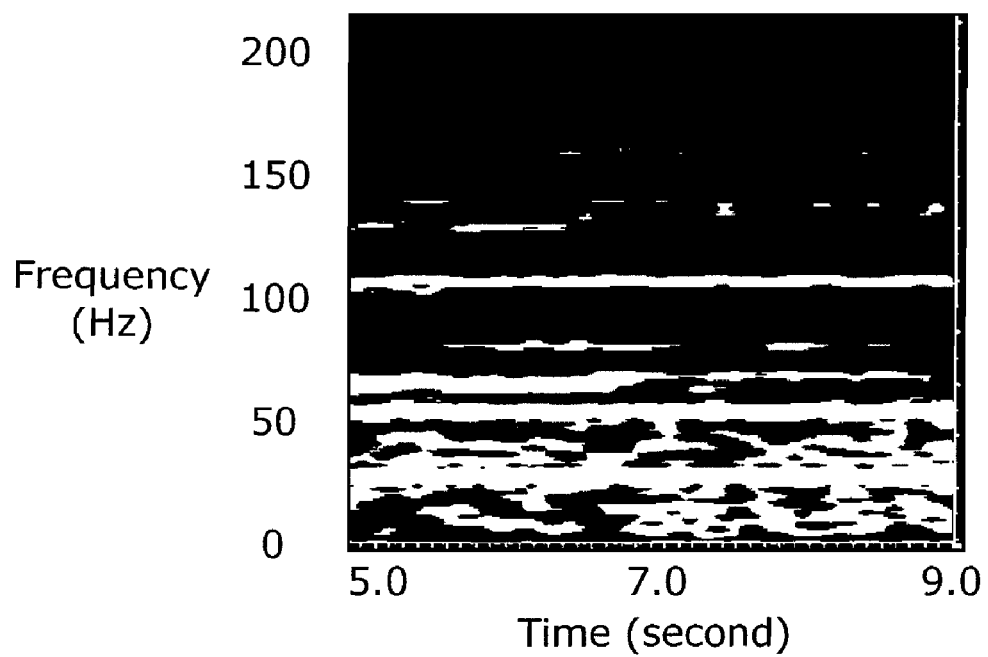
FIG. 3 is a graph showing values of shading in the spectrogram of FIG. 2 as binarized data.
Figure 4B:
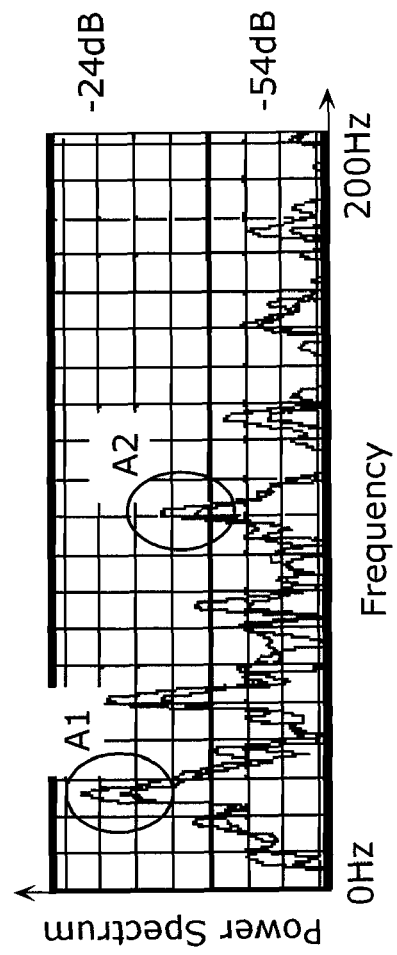
FIG. 4B is a graph showing one example of frequency signals (power spectrums) of the noise.
Figure 4A:
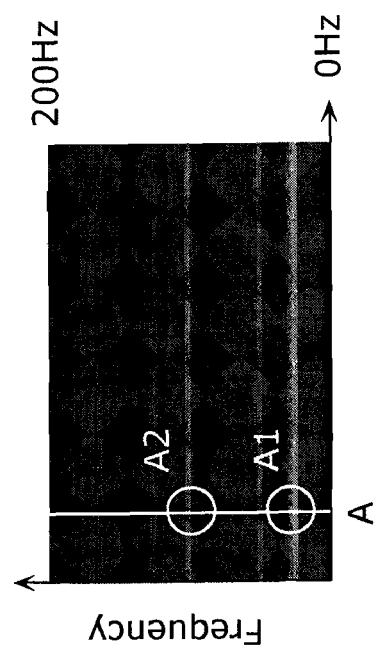
FIG. 4A is a graph showing one example a spectrogram of a noise.
Figure 5B:
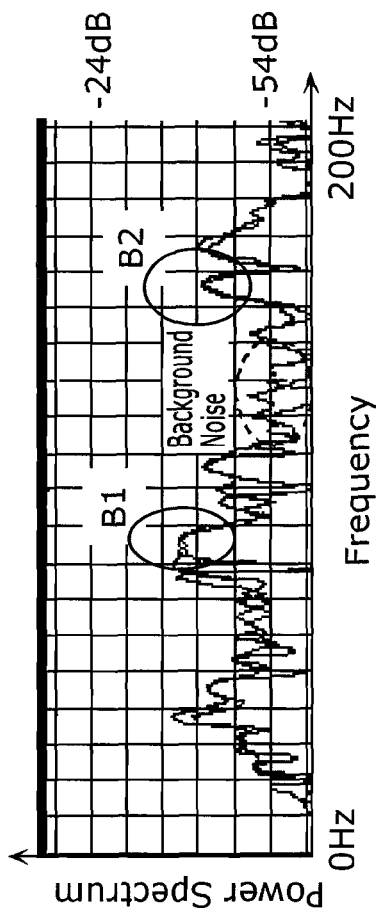
FIG. 5B is a graph showing one example of frequency signals (power spectrums) of the extraction sound.
Figure 5C:
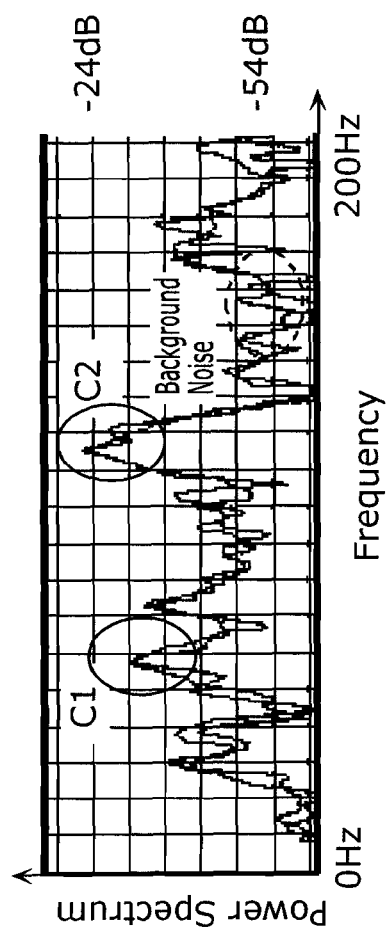
FIG. 5C is a graph showing another example of frequency signals (power spectrums) of the extraction sound.
Figure 5A:
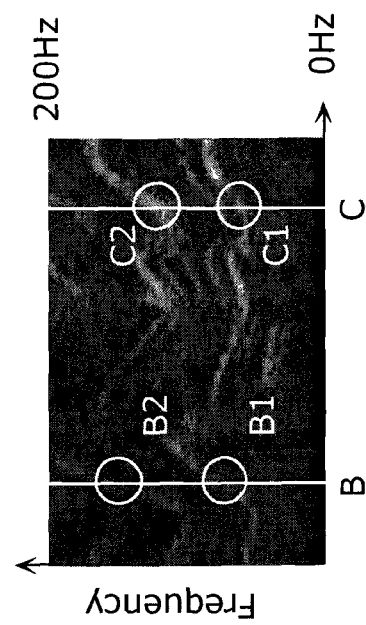
FIG. 5A is a graph showing one example a spectrogram of an extraction sound.
Figure 6:
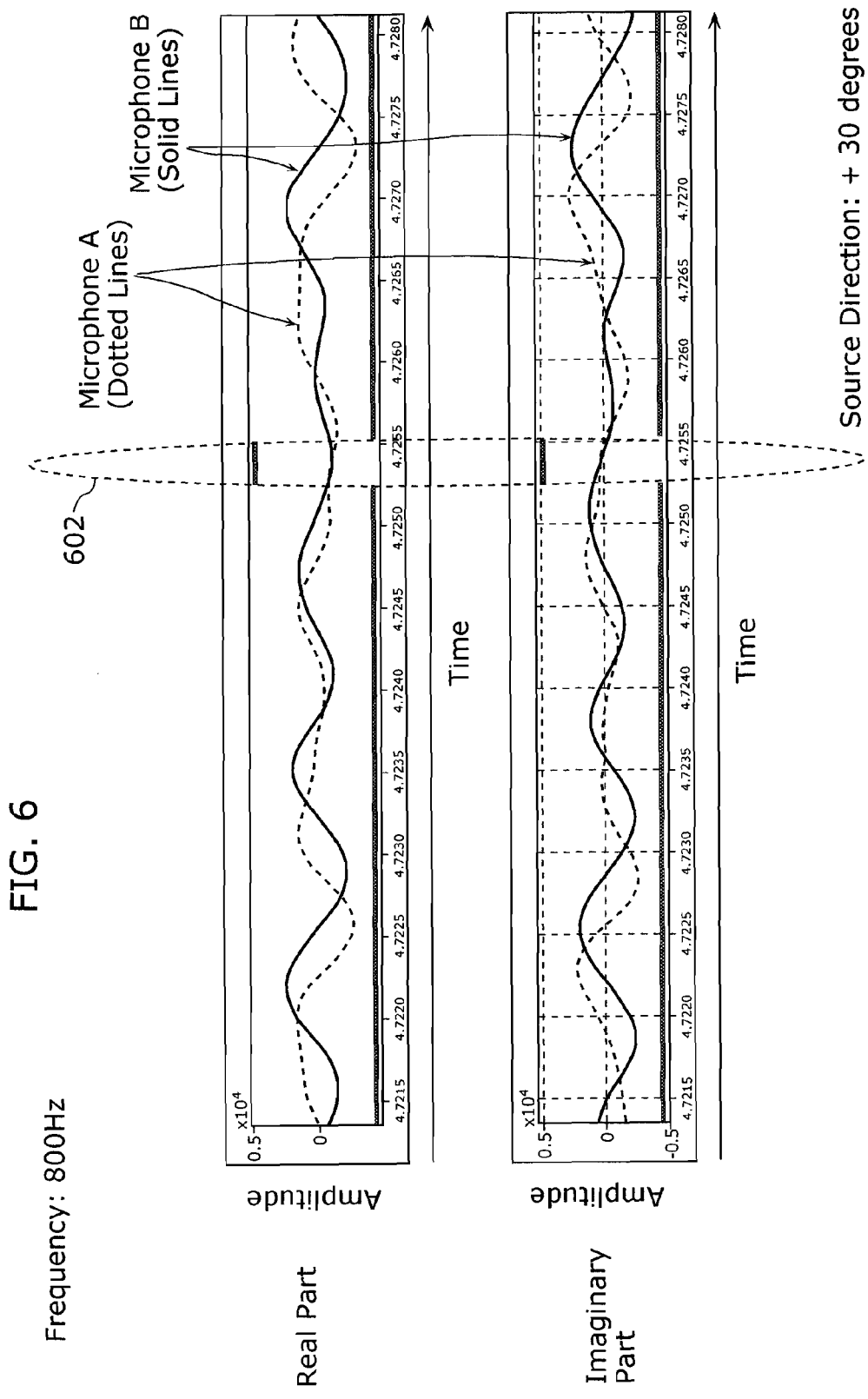
FIG. 6 shows graphs of one example of frequency signals of a mixed sound.
Figure 7:
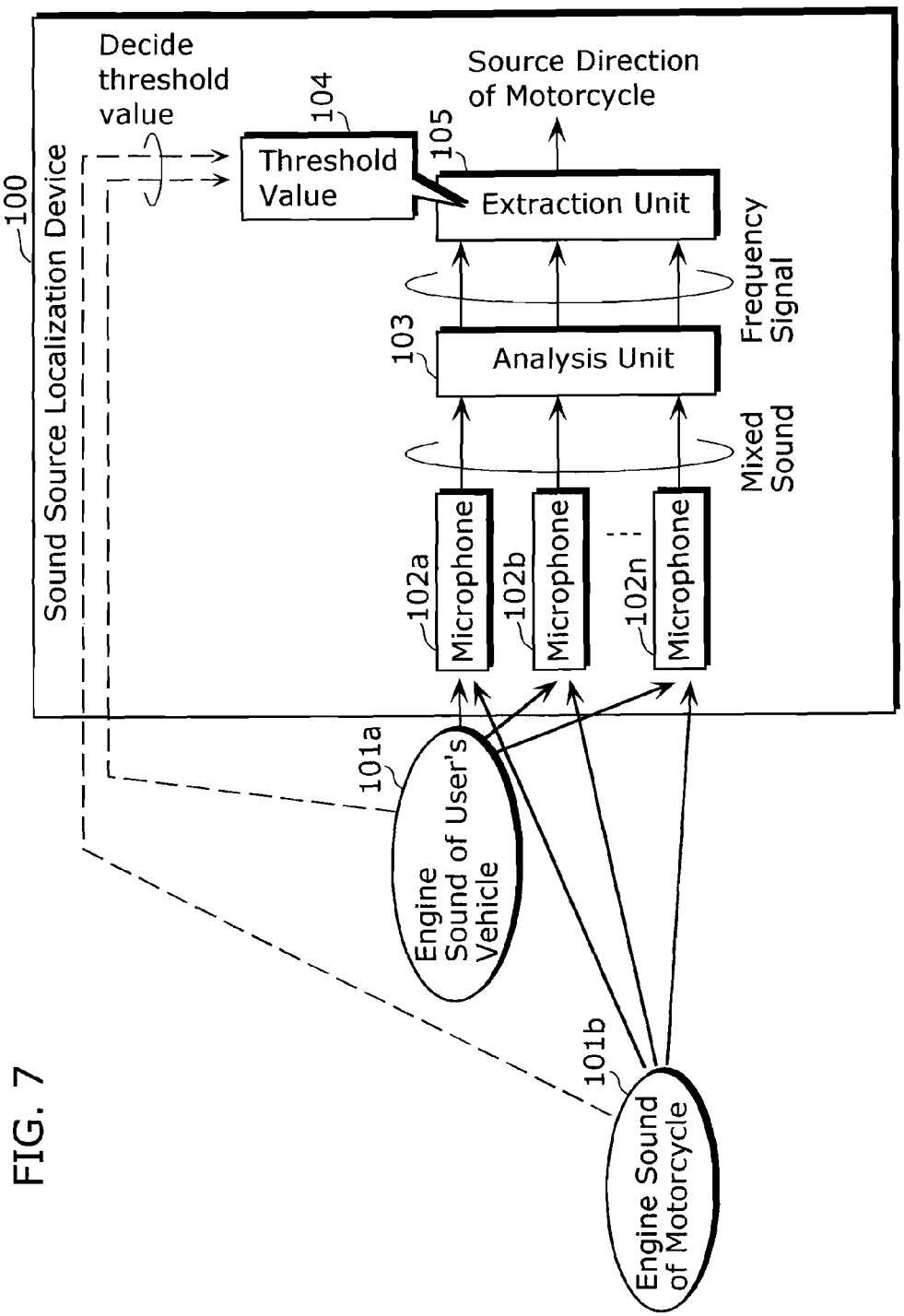
FIG. 7 is a block diagram of an overall structure of a sound source localization device according to an embodiment of the present invention.

FIG. 7 is a block diagram of a structure of a sound source localization device according to the embodiment of the present invention. In this description it is assumed that the sound source localization device according to the present invention is mounted on a vehicle.

The sound source localization device 100 detects a direction of a sound source (source direction) or a location of the sound source (source location) of a vehicle near a user's vehicle on which the sound source localization device 100 is mounted. The sound source localization device 100 includes two or more microphones 102a to 102n, an analysis unit 103, and an extraction unit 105. Each of the microphones converts sound waves which propagate through a transmission medium (gas, solid, or liquid), into electric signals.

The microphones 102a to 102n are arranged so that a difference distance regarding frequency signals among the microphones 102a to 102n is greater than a threshold value 104 (threshold value). Here, a time axis of the frequency signals has been adjusted for an engine sound 101a produced by a user's vehicle (sound to be removed), so that a reaching time difference among the microphones 102a to 102n becomes 0 (in other words, there is no time difference between when the engine sound 101a reaches one of the microphones 102a to 102n and when the engine sound 101a reaches another). A method of calculating the "difference distance" is explained further below in detail.

Figure 8:
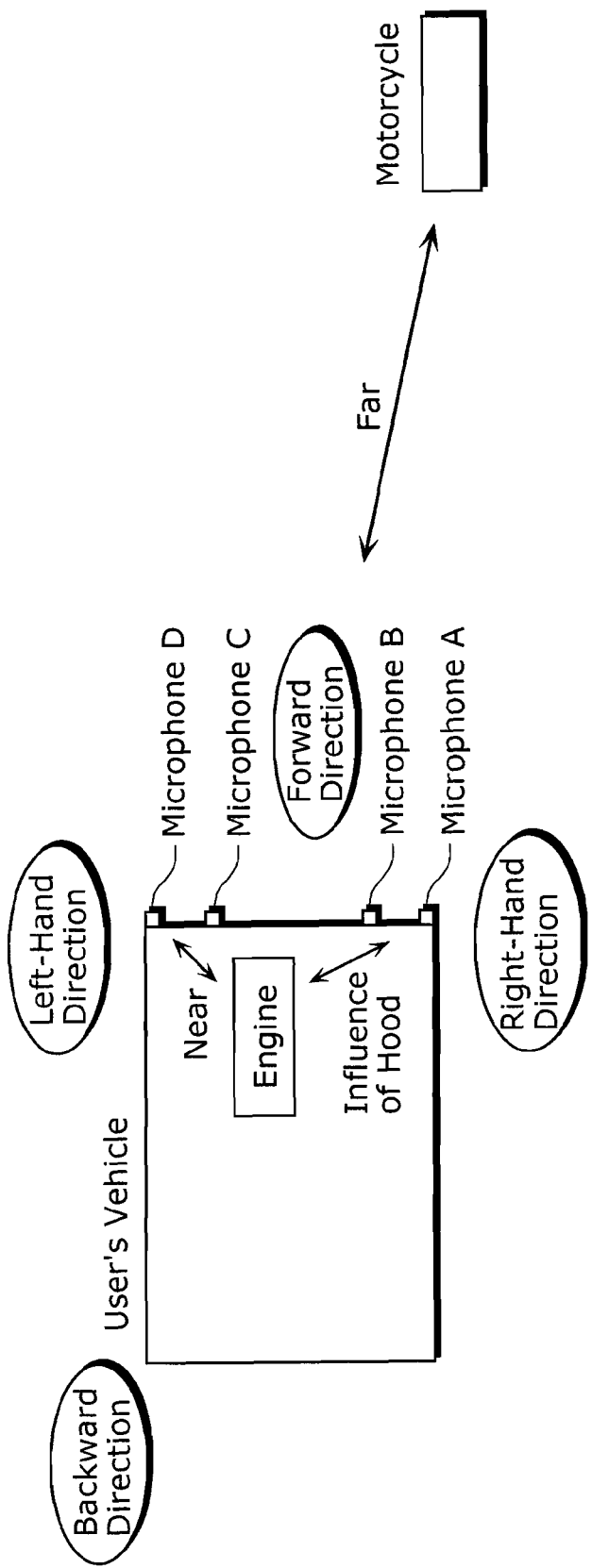
FIG. 8 is a diagram for explaining an arrangement of microphones.

FIG. 8 is a diagram showing one example of an arrangement of four microphones in a bumper at a front part of the user's vehicle. In this example, each interval between microphones A and B and between microphones C and D is set to 17.5 cm, and an interval between the microphones B and C is set to about 1 m.

A sound pressure sensitivity level is attenuated by 6 dB when a distance from a sound source becomes double. Here, a distance between the engine of the user's vehicle and each of the microphones is short. Thereby, a ratio of (i) a distance between the sound source and one microphone and (ii) a distance between the sound source and another microphone is increased, so that sound pressure sensitivity levels of the engine sounds which are produced by the user's vehicle and received by the four microphones A, B, C, and D are different from one another among the four microphones A, B, C, and D.

On the other hand, regarding an engine sound of a motorcycle which is far from the microphones, a ratio of (i) a distance between the sound source (motorcycle) and one microphone and (ii) a distance between the sound source (motorcycle) and another microphone is almost 1, so that sound pressure sensitivity levels are not different among the four microphone A, B, C, and D.

Furthermore, it is suggested that, a waveform of the engine sound produced by the user's vehicle which each of the four microphones receives is distorted by influence of a hood of the user's vehicle or the like. Still further, the waveform which each of the four microphones receives is distorted, when joint parts between the respective four microphones and the user's vehicle are made of materials having different sound transmission characteristics on purpose.

Frequency signals which the respective microphones receive are different among the microphones, (i) in the case where there are a path in which the engine sound produced by the user's vehicle propagates through a hood and a path in which the engine sound does not propagate through the hood, among various transmission paths of the engine sound between a location of the engine to the respective microphones, or (ii) in the case where a distance in which the engine sound propagates in the hood is different for each of the microphones. This is because the path in which the engine sound propagates through the hood has a high density, and the path in which the engine sound does not propagate through the hood (for example, the engine sound propagates in air), for example, so that there is a difference in density among materials existing in the transmission path of the engine sound. Depending on the difference in density, an attenuation rate of the engine sound is changed.

Therefore, even if respective distances of the transmission paths between the location of the engine and the respective microphones are almost the same, when respective materials positioned between the engine and the respective microphones are made of various materials having different density or different shapes, it is possible to differently distort respective waveforms which the respective microphones receive. As a result, the difference distance among the microphones is increased.

Furthermore, if the microphones are embedded in a bumper or the like of the user's vehicle, and a joint part (a part of each microphone, except a part protruding from a body of the user's vehicle) between each microphone and the bumper is made of a material having transmission characteristics different depending on each of such joint parts. Here, the "transmission characteristics different" means that an acoustic impedance (density of a transmission medium× speed of a sound wave propagating through the transmission medium) is different. A sound wave is reflected at a boundary of materials having different acoustic impedances, when transmitting through the materials. A degree of the reflection is greater when a difference in an acoustic impedance between the transmission materials is greater, and the degree of the reflection is changed depending of a difference in an acoustic impedance. Therefore, by using materials having different transmission characteristics between the engine and the respective microphones, it is possible to differently distort respective waveforms which the respective microphones receive, which results in increase of the difference distance among the microphones.

Figure 9:
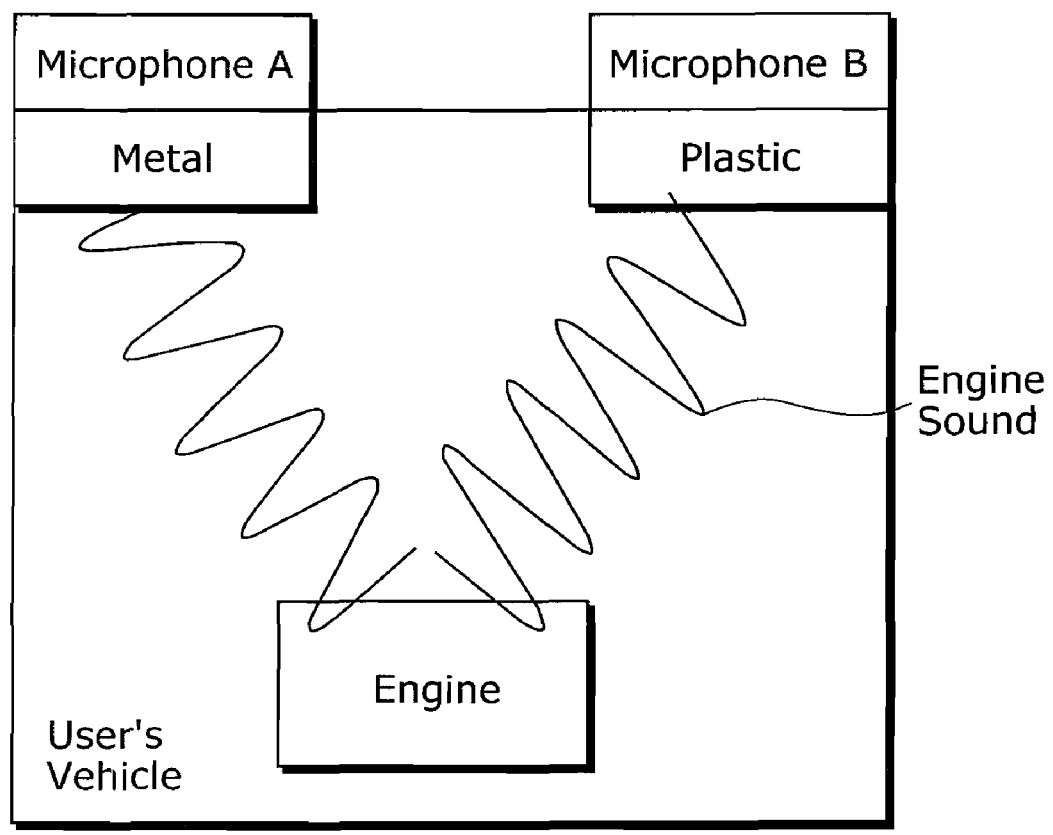
FIG. 9 is a diagram showing an example of a structure using materials having different transmission characteristics among microphones of a user's vehicle.

FIG. 9 is a diagram showing an example of a structure using materials having different transmission characteristics among the microphones of the user's vehicle. The user's vehicle includes (i) an engine, and (ii) a microphone A and a microphone B each of which receives an engine sound produced by the engine. Moreover, there are a metal between the engine and the microphone A, and a plastic between the engine and the microphone B. It is assumed that the engine sound (each waved line) is propagated from the engine to the microphone A and the microphone B. A degree of reflection is different between the case where the engine sound propagates through the metal and the case where the engine sound propagates through the plastic. Therefore, a distortion of a waveform is different between a waveform which the microphone A receives and a waveform which the microphone B receives. As a result, a difference distance is increased between the microphones A and B. It should be noted that the metal and plastic have been mentioned, but any materials having different transmission characteristics can increase the difference distance. It should be noted that it has been described as one example that a metal is arranged between the engine and one of the microphones and a plastic is arranged between the engine and the other microphone. But it is also possible to arrange a metal, plastic, or the like between the engine and one of the microphones, and arrange none between the engine and the other microphone. It is also possible to arrange both of a metal and a plastic between the engine and one of the microphones, and arrange only a plastic between the engine and the other microphone.

Figure 10:
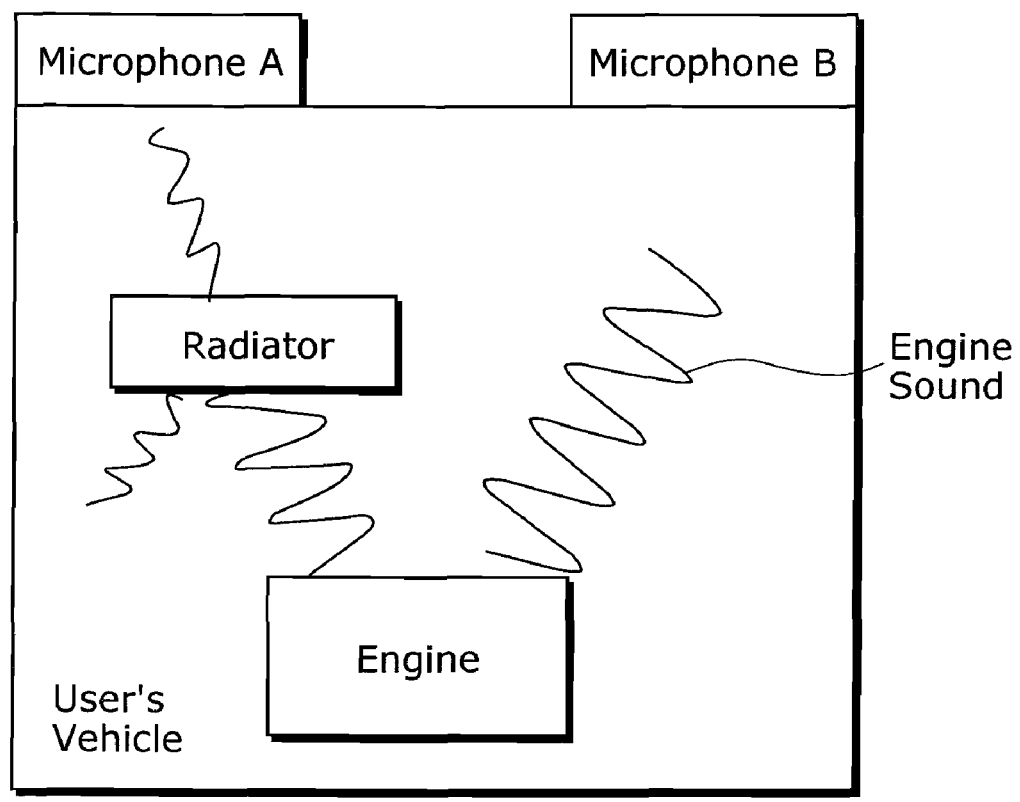
FIG. 10 is a diagram showing a structure of a user's vehicle having a radiator.

FIG. 10 is another structure including an engine, a microphone A, and a microphone B, in the similar manner of FIG. 9. In FIG. 10, there is a radiator between the engine and the microphone A, and there is none between the engine and the microphone B. A part of an engine sound propagating from the engine to the microphone A is reflected due to the existence of the radiator. This is because there is a great difference in acoustic impedances between liquid in the radiator and air through which the engine sound propagates, so that the engine sound is reflected at the radiator. The reflection can cause a difference in distortion between a waveform which the microphone A receives and a waveform which the microphone B receives, which increases the difference distance. In other words, the difference distance can be increased by arranging, between one of the microphones and the engine, a material having an acoustic impedance that is significantly different from an acoustic impedance of air and arranging, between the other microphone and the engine, no material other than air or only a material having the almost same acoustic impedance as air.

Each of FIGS. 11A and 11B shows one example of an experimental result of the arrangement of the microphones where a difference distance between the microphones A and D regarding the engine sound 101a (idling sound) produced by the user's vehicle becomes greater than the threshold value 104. FIG. 11A shows a spectrogram of the engine sound 101a produced by the user's vehicle which the microphone A receives. FIG. 11B shows a spectrogram of the engine sound 101a produced by the user's vehicle which the microphone B receives. A horizontal axis of each of the spectrograms is a time axis, and a vertical axis is a frequency axis. Further, in this spectrogram, a paler color part has a higher sound pressure sensitivity level (signal level), and a darker color part has a lower sound pressure sensitivity level.

Figure 12A:
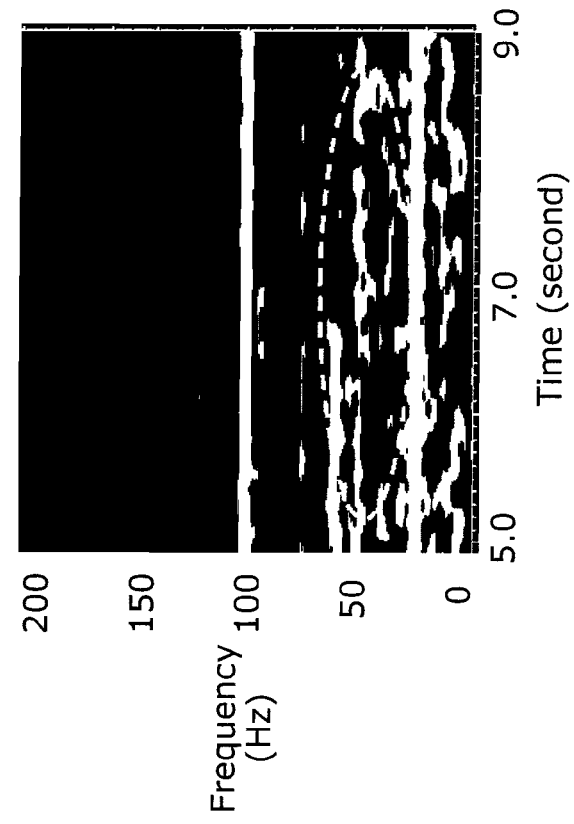
FIG. 12A is a graph showing values of shading in the spectrogram of FIG. 11A as binarized data.
Figure 12B:
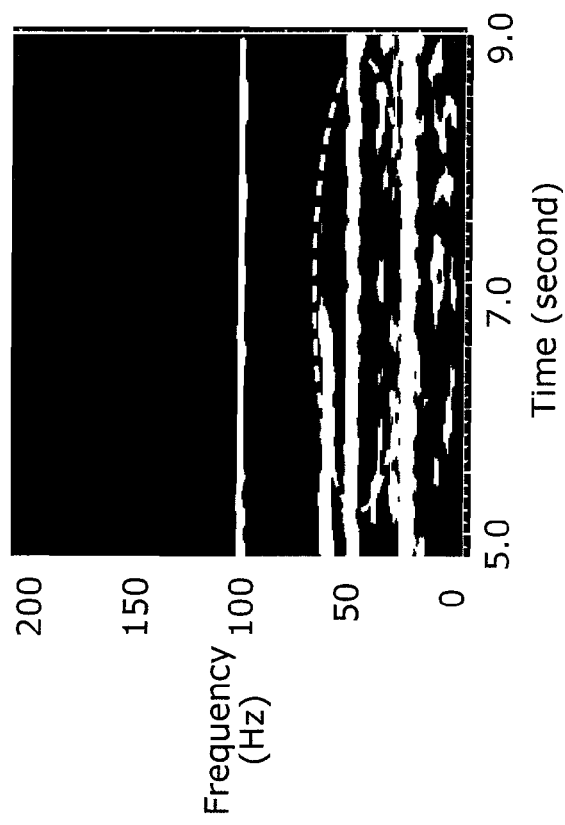
FIG. 12B is a graph showing values of shading in the spectrogram of FIG. 11B as binarized data.

When the spectrogram of FIG. 11A is compared to the spectrogram of FIG. 11B, these two spectrograms are different from each other. Especially, by comparing regions enclosed by broken lines with each other, it is clearly seen that frequency signals of the engine sound 101a produced by the user's vehicle are distorted differently between FIG. 11A and FIG. 11B. Moreover, for the sake of easy understanding of the spectrogram, FIGS. 12A and 12B show binarized data of values of shading in the spectrograms of FIGS. 11A and 11B, respectively.

The analysis unit 103 analyzes a frequency of a mixed sound which each of the microphones 102a to 102n receives. The mixed sound includes (i) the engine sound 101a produced by the user's vehicle (sound to be removed from the mixed sound) and (ii) the engine sound 101b of the motorcycle (sound to be extracted from the mixed sound). Thereby, the analysis unit 103 generates frequency signals corresponding to each of the microphones 102a to 102n.

The extraction unit 105 adjusts a time axis of the frequency signals analyzed by the analysis unit 103, so that a reaching time difference among the microphones 102a to 102n becomes 0 (in other words, there is no time difference between when the engine sound 101b produced by the motorcycle (sound to be extracted) travels in a candidate source direction and reaches one of the microphones 102a to 102n and when the engine sound 101b produced by the motorcycle travels in the candidate source direction and reaches another). In other words, the time axis of the frequency signals corresponding to each of the microphones 102a to 102n is adjusted so that there is no time difference between when the sound produced by the motorcycle is assumed to reach one of the microphones 102a to 102n and when the sound produced by the motorcycle is assumed to reach another.

In addition, from the frequency signals with the time axis having been adjusted, the extraction unit 105 removes a part of the frequency signals having a difference distance among the microphones that is greater than the threshold value 104. Then, from the frequency signals from which the above part has been removed, the extraction unit 105 extracts a source direction of the engine sound 101b produced by the motorcycle.

Figure 13:
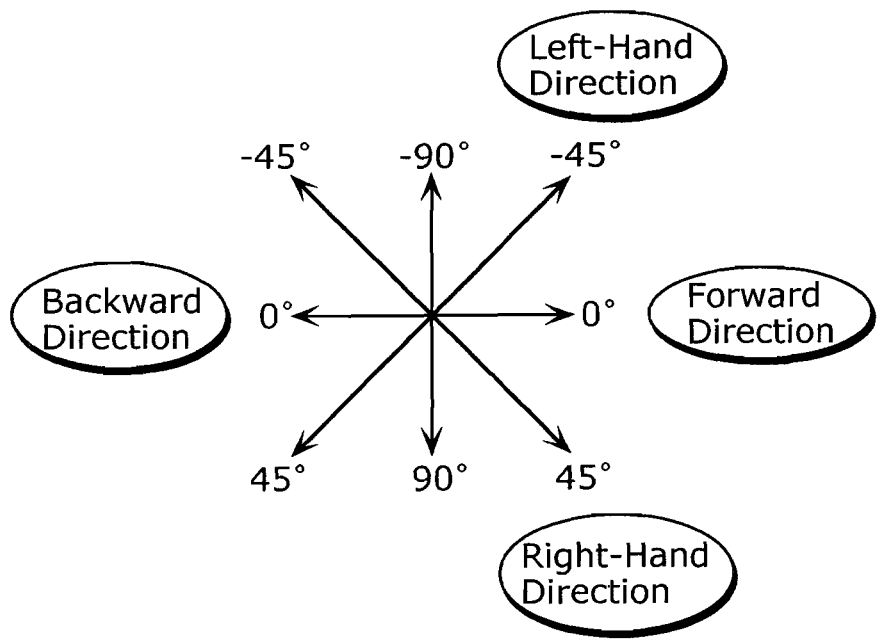
FIG. 13 is a diagram for explaining source directions.

Here, the source direction is represented by a direction (angle) ranging from −90 degrees to 90 degrees. FIG. 13 is a diagram for explaining such source directions. Here, a forward direction and a backward direction of the user's vehicle are expressed as 0 degree, a right-hand direction along an axis perpendicular to the forward direction is expressed as 90 degrees, and a left-hand direction along the axis perpendicular to the forward direction is expressed as −90 degrees.

Moreover, the threshold value 104 is set so that a difference distance among the microphones regarding the engine sound 101b produced by the motorcycle (sound to be extracted) becomes smaller than the threshold value 104. In other words, the microphones 102a to 102n are arranged so that the difference distance among the microphones regarding the engine sound 101b produced by the motorcycle (sound to be extracted) becomes smaller than the set threshold value 104. In this example, by comparing (i) the arrangement of the microphones, (ii) the difference distance regarding the engine sound 101a produced by the user's vehicle among the microphones in the arrangement, and (iii) the difference distance regarding the engine sound 101b produced by the motorcycle among the microphones, with one another, a value of the threshold value 104 is determined experimentally so that a source direction of the engine sound 101b produced by the motorcycle can be detected.

Thereby, using the sound source localization device 100, it is possible to remove influence of the engine sound produced by the user's vehicle, thereby extracting a source direction of an approaching motorcycle or the like, and eventually informing a driver (user) about the approaching motorcycle. Therefore, the sound source localization device 100 is quite useful as a function of supporting safe driving.

Next, the processing performed by the sound source localization device 100 having the above structure is described.

Figure 14:
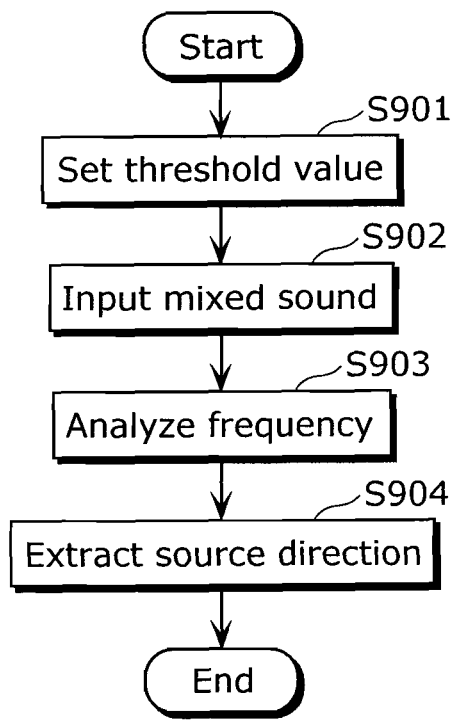
FIG. 14 is a flowchart of processing performed by the sound source localization device.

FIG. 14 is a flowchart of the processing performed by the sound source localization device 100.

In this example, as shown in FIG. 8, the four microphones A, B, C, and D are assumed to be arranged in the bumper at the front side of the user's vehicle. Moreover, under the assumption of the microphone arrangement shown in FIG. 8, the threshold value 104 is determined experimentally based on a difference distance among the microphones regarding the engine sound 101a produced by the user's vehicle and a difference distance among the microphones regarding the engine sound 101b produced by the motorcycle (Step S901). In this example, the threshold value 104 is assumed to be 30%.

Figure 15A:
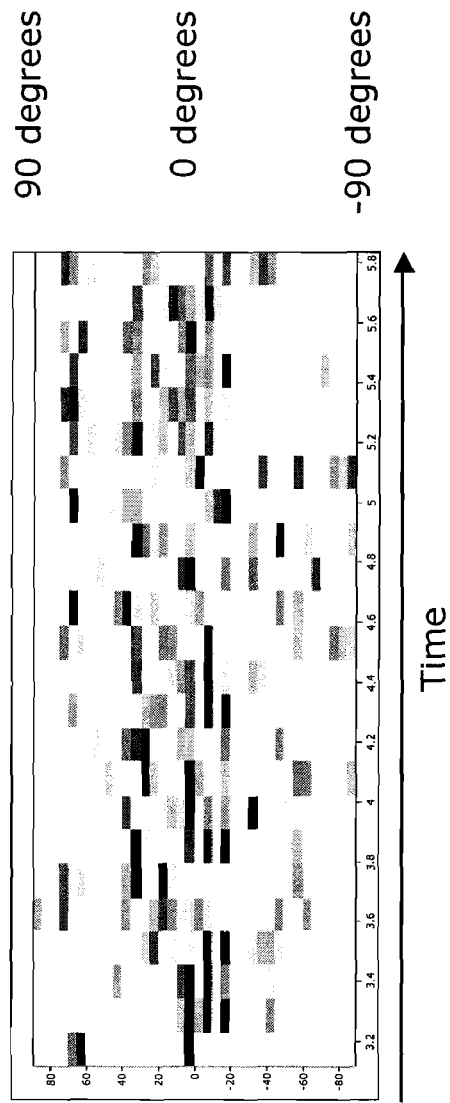
FIG. 15A is a graph showing one example of a result of analyzing a source direction of an engine sound of a user's vehicle by the conventional method.
Figure 15B:
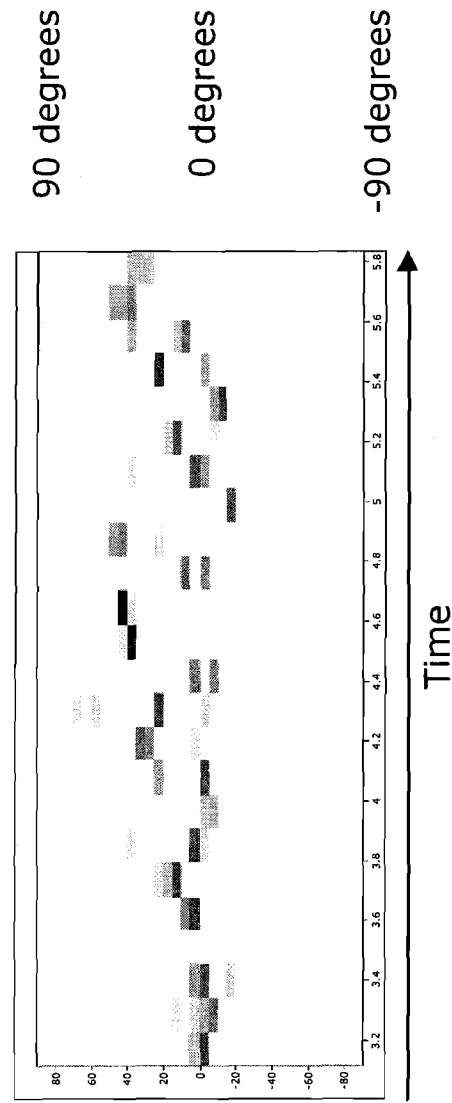
FIG. 15B is a graph showing one example of a result of analyzing a source direction of the engine sound produced by the user's vehicle according to the present embodiment.

Each of FIGS. 15A and 15B is a graph showing one example of a result of analyzing a source direction of the engine sound 101a produced by the user's vehicle, regarding the microphone A and the microphone D shown in FIG. 8. FIG. 15A is a graph regarding the conventional method without using any threshold value for the analyzing, and FIG. 15B is a graph regarding the method using a threshold value (threshold value processing) according to the present invention.

In each of the graphs shown in FIGS. 15A and 15B, a horizontal axis represents a time, and a vertical axis represents a source direction (ranging from −90 degrees to 90 degrees). Here, in each of the graphs, a darker color part has a higher probability that a sound source exists in a source direction represented by the part, and a paler color part has a lower probability that a sound source exists in a source direction represented by the part.

FIG. 15A shows a result of analyzing a source direction based on a reaching time difference regarding the engine sound 101a produced by the user's vehicle between the microphone A and the microphone D (in other words, based on a time difference between when the engine sound 101a produced by the user's vehicle reaches the microphone A and when the engine sound 101a produced by the user's vehicle reaches the microphone D). The analysis of FIG. 15A is performed on frequency signals of both (i) a part having a difference distance between the microphones A and D that is greater than the threshold value 104, and (ii) a part having a difference distance between the microphones A and D that is smaller than the threshold value 104. In other words, the analysis of FIG. 15A is performed without using any threshold value. As shown in FIG. 15A, a source direction of the engine sound 101a produced by the user's vehicle is detected widely ranging from −90 degrees to 90 degrees.

Figure 16A:
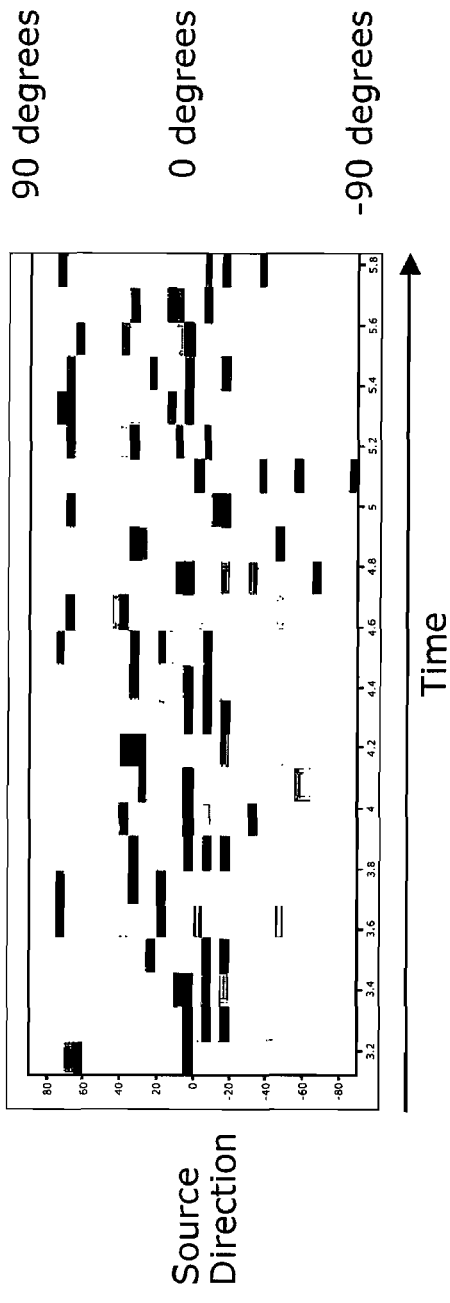
FIG. 16A is a graph showing values of shading in the graph of FIG. 15A as binarized data.
Figure 16B:
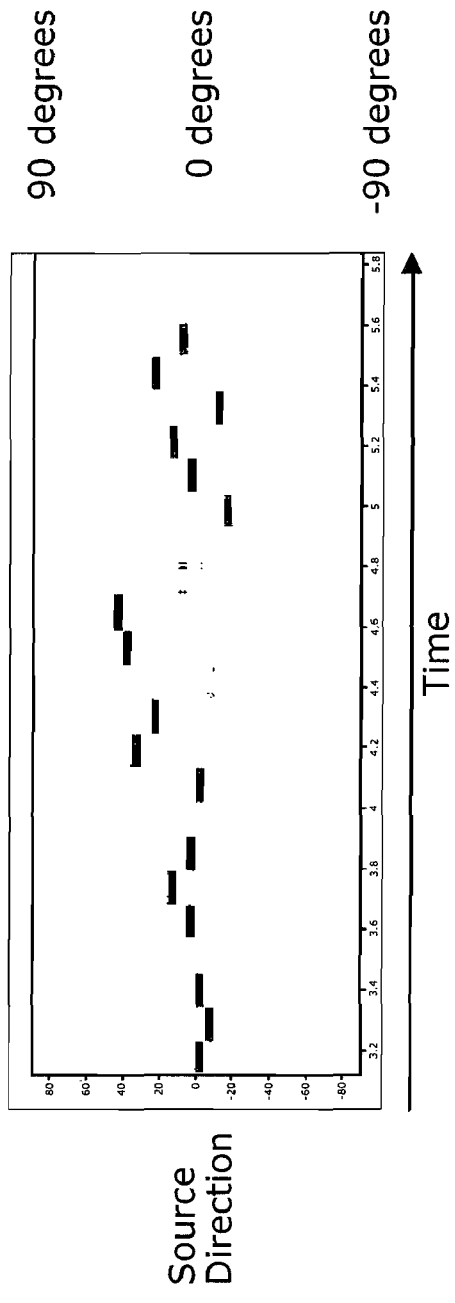
FIG. 16B is a graph showing values of shading in the graph of FIG. 15B as binarized data.

FIG. 15B shows a result of analyzing a source direction based on a reaching time difference between the microphones A and D regarding the engine sound 101a produced by the user's vehicle (in other words, based on a time difference between when the engine sound 101a produced by the user's vehicle reaches the microphone A and when the engine sound 101a produced by the user's vehicle reaches the microphone D) in the similar manner to the conventional method shown in FIG. 15A. However, the analysis of FIG. 15B is performed on frequency signals of only a part except a removed part that has a difference distance between the microphones A and D that is greater than the threshold value 104 (namely, frequency signals regarding the engine sound 101a produced by the user's vehicle). In other words, the analysis of FIG. 15B is performed using a threshold value, which is the threshold value processing characterized in the present invention. By comparing FIG. 15A to 15B, it is understood that, by removing a part having a difference distance between the microphones A and D that is greater than the threshold value 104 (namely, the frequency signals regarding the engine sound 101a produced by the user's vehicle), it is possible to significantly remove influence of the engine sound 101a produced by the user's vehicle from the frequency signals from which the source direction is to be detected. For the sake of easy understanding of the graphs, FIGS. 16A and 16B show binarized data of values of shading in the graphs of FIGS. 15A and 15B, respectively.

Figure 17A:
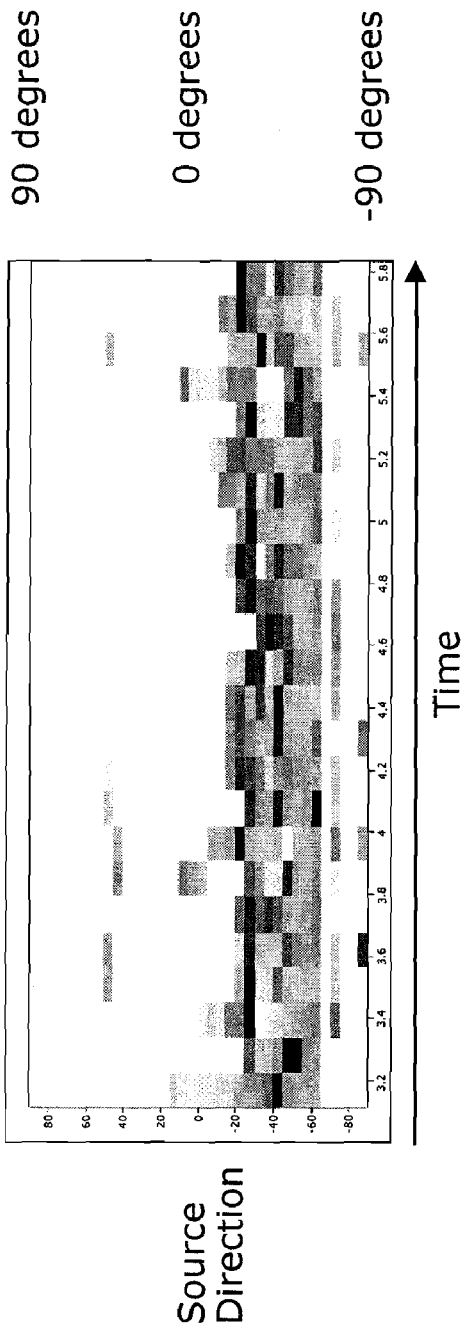
FIG. 17A is a graph showing one example of a result of analyzing a source direction of an engine sound of a user's vehicle.
Figure 17B:
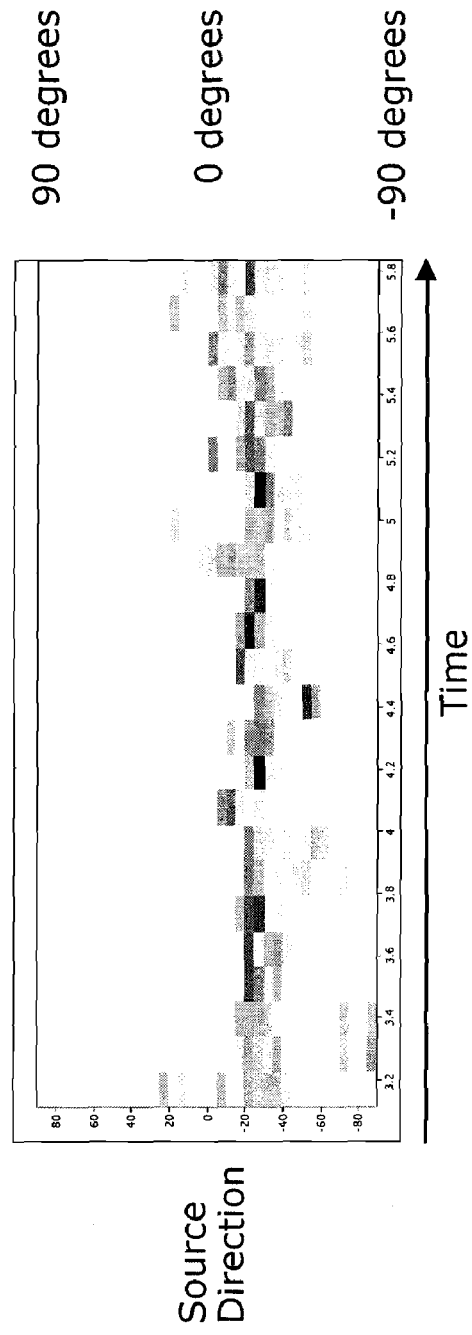
FIG. 17B is a graph showing one example of a result of analyzing a source direction of the engine sound produced by the user's vehicle.

Each of FIGS. 17A and 17B is a graph showing one example of a result of analyzing a source direction of the engine sound 101a produced by the user's vehicle, regarding the microphone A and the microphone B shown in FIG. 8. FIGS. 17A and 17B are plotted in the same manner as explained for FIGS. 15A and 15B, respectively.

Figure 18A:
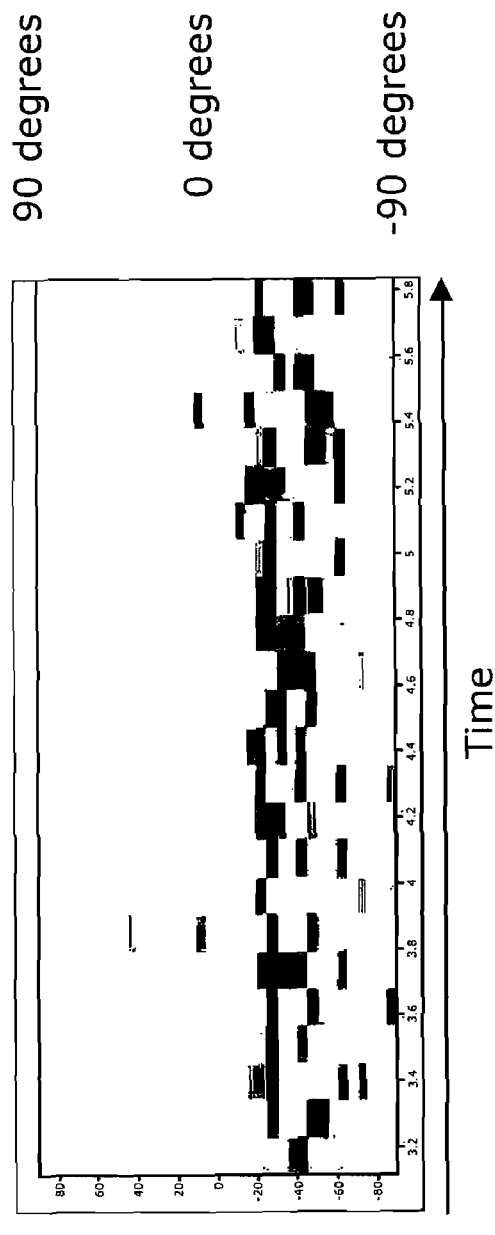
FIG. 18A is a graph showing values of shading in the graph of FIG. 17A as binarized data.
Figure 18B:
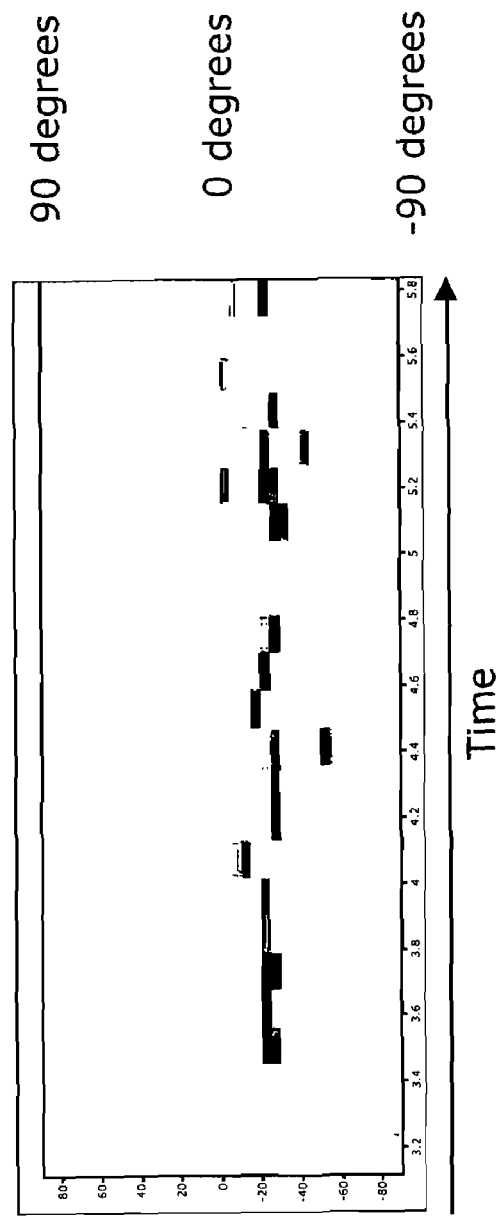
FIG. 18B is a graph showing values of shading in the graph of FIG. 17B as binarized data.

FIG. 17A shows a result of analyzing the source direction based on a reaching time difference between the microphones A and B regarding the engine sound 101a produced by the user's vehicle (in other words, based on a time difference between when the engine sound 101a produced by the user's vehicle reaches the microphone A and when the engine sound 101a produced by the user's vehicle reaches the microphone B). The analysis of FIG. 17A is performed on frequency signals of both (i) a part having a difference distance between the microphones A and B that is greater than the threshold value 104 and (ii) a part having a difference distance between the microphones A and B that is smaller than the threshold value 104. In other words, the analysis of FIG. 17A is performed without using any threshold value. FIG. 17B shows a result of analyzing the source direction based on a reaching time difference between the microphones A and B regarding the engine sound 101a produced by the user's vehicle (in other words, based on a time difference between when the engine sound 101a produced by the user's vehicle reaches the microphone A and when the engine sound 101a produced by the user's vehicle reaches the microphone B) in the similar mariner to the conventional method shown in FIG. 17A. However, the analysis of FIG. 17B is performed on frequency signals of only a part except a removed part having a difference distance between the microphones A and B that is greater than the threshold value 104 (namely, the frequency signals regarding the engine sound 101a produced by the user's vehicle). In other words, the analysis of FIG. 17B is performed using a threshold value, which is the threshold value processing characterized in the present invention. By comparing FIG. 17A to 17B, it is understood that, by removing a part having a difference distance between the microphones A and B that is greater than the threshold value 104 (namely, frequency signals regarding the engine sound 101a produced by the user's vehicle), it is possible to significantly remove influence of the engine sound 101a produced by the user's vehicle from the frequency signals from which the source direction is to be detected. For the sake of easy understanding of the graphs, FIGS. 18A and 18B show binarized data of values of shading in the graphs of FIGS. 17A and 17B, respectively.

Figure 19A:
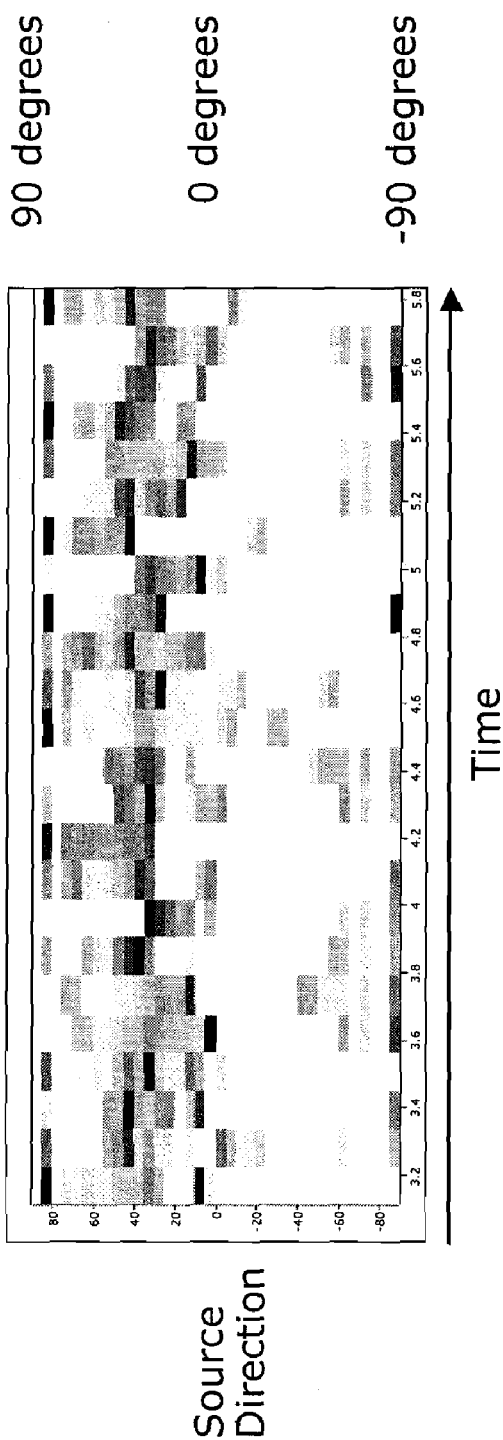
FIG. 19A is a graph showing one example of a result of analyzing a source direction of an engine sound of a user's vehicle.
Figure 19B:
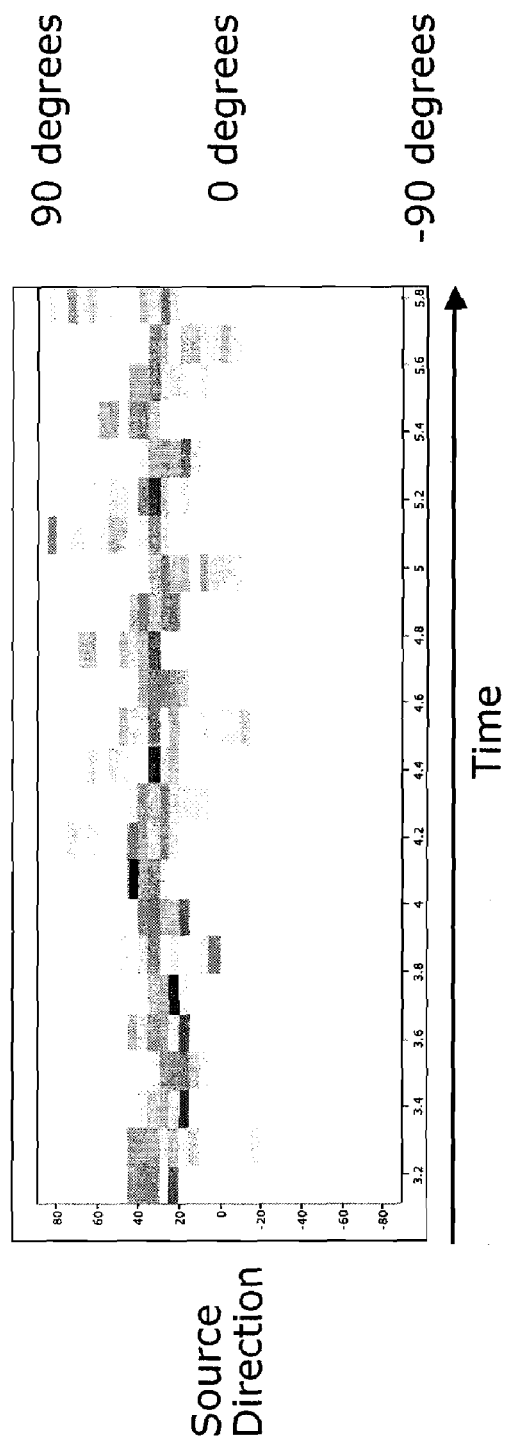
FIG. 19B is a graph showing one example of a result of analyzing a source direction of the engine sound produced by the user's vehicle.

Each of FIGS. 19A and 19B is a graph showing one example of a result of analyzing a source direction of the engine sound 101a produced by the user's vehicle, regarding the microphone C and the microphone D shown in FIG. 8. FIGS. 19A and 19B are plotted in the same manner as explained for FIGS. 15A and 15B, respectively.

Figure 20A:
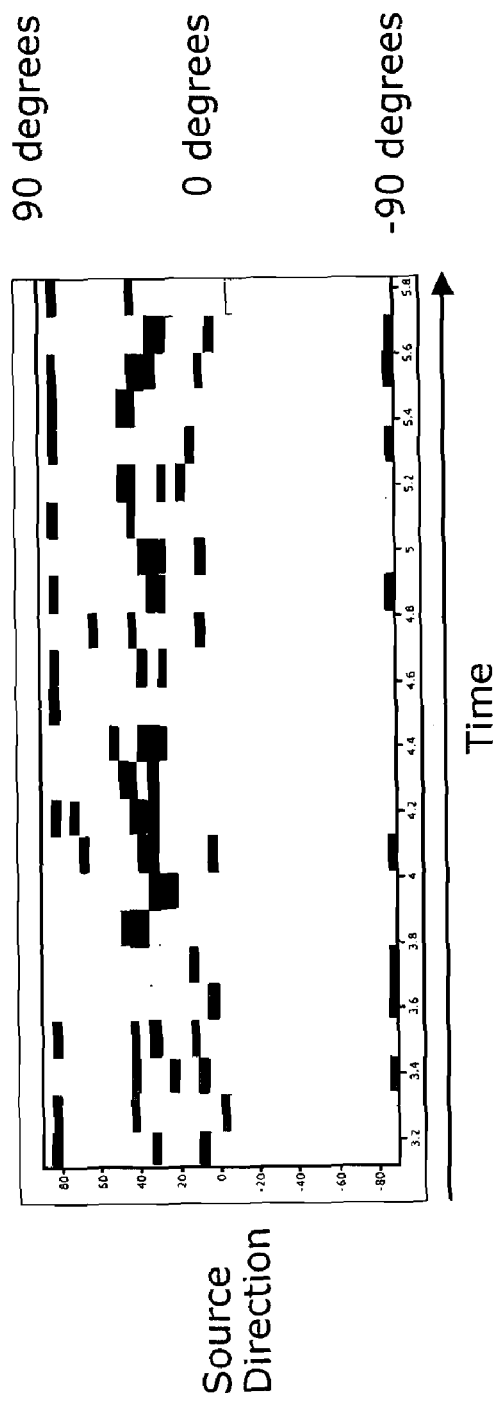
FIG. 20A is a graph showing values of shading in the graph of FIG. 19A as binarized data.
Figure 20B:
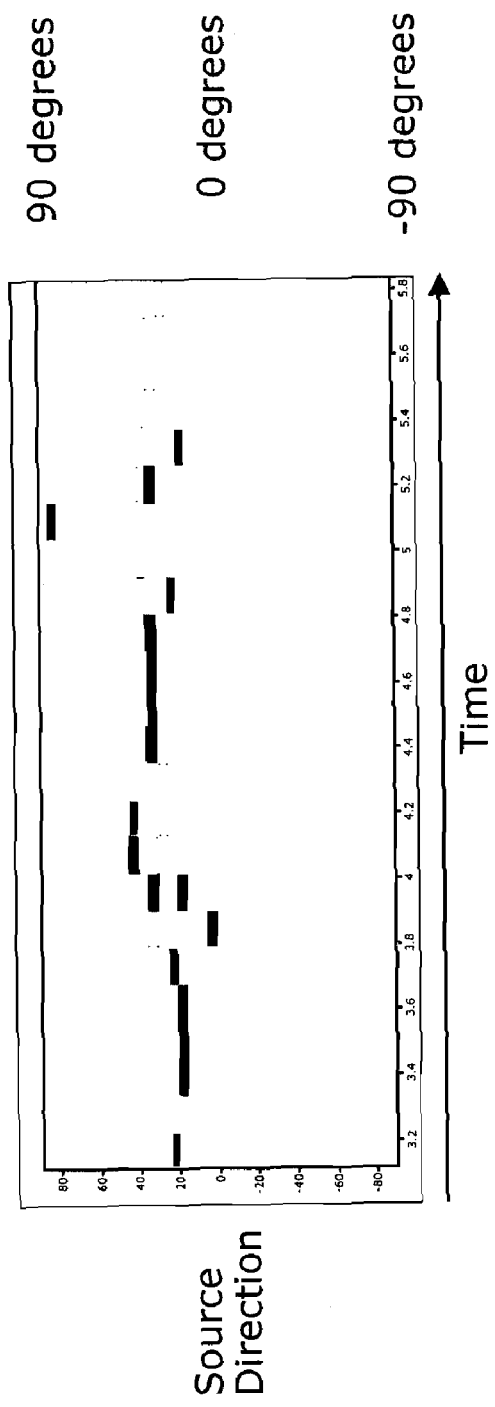
FIG. 20B is a graph showing values of shading in the graph of FIG. 19B as binarized data.

FIG. 19A shows a result of analyzing the source direction based on a reaching time difference between the microphones C and D regarding the engine sound 101a produced by the user's vehicle (in other words, based on a time difference between when the engine sound 101a produced by the user's vehicle reaches the microphone C and when the engine sound 101a produced by the user's vehicle reaches the microphone D). The analysis of FIG. 19A is performed on frequency signals of both (i) a part having a difference distance between the microphones C and D that is greater than the threshold value 104 and (ii) a part having a difference distance between the microphones C and D that is smaller than the threshold value 104. In other words, the analysis of FIG. 19A is performed without using a threshold value. FIG. 19B shows a result of analyzing the source direction based on a reaching time difference between the microphones C and D regarding the engine sound 101a produced by the user's vehicle (in other words, based on a time difference between when the engine sound 101a produced by the user's vehicle reaches the microphone C and when the engine sound 101a produced by the user's vehicle reaches the microphone D) in the similar manner to the conventional method shown in FIG. 19A. However, the analysis of FIG. 19B is performed on frequency signals of only a part except a removed part having a difference distance between the microphones C and D that is greater than the threshold value 104 (namely, the frequency signals regarding the engine sound 101a produced by the user's vehicle). In other words, the analysis of FIG. 19B is performed using a threshold value, which is the threshold value processing characterized in the present invention. By comparing FIG. 19A to 19B, it is understood that, by removing a part having a difference distance that is greater than the threshold value 104 (namely, the frequency signals regarding the engine sound 101a produced by the user's vehicle), it is possible to significantly remove influence of the engine sound 101a produced by the user's vehicle from the frequency signals from which the source direction is to be detected. For the sake of easy understanding of the graphs, FIGS. 20A and 20B show binarized data of values of shading in the graphs of FIGS. 19A and 19B, respectively.

Accordingly, it is understood that the microphones are arranged as shown in FIG. 8 so that a difference distance among the microphones regarding the engine sound 101a produced by the user's vehicle becomes greater than the threshold value 104. However, as seen in FIGS. 15B, 17B, and 19B, in these examples, the influence of the engine sound 101a produced by the user's vehicle cannot be completed removed. Therefore, in these examples, the part of the engine sound 101a produced by the user's vehicle which can be removed is considered as a predetermined noise to be removed. Moreover, in these examples, the threshold value is set so that a source direction of the engine sound produced by the motorcycle is not removed.

Furthermore, if one of the two microphones is arranged near to the engine of the user's vehicle and the other microphone is arranged far from the engine so that a ratio of a distance between the engine and one microphone to a distance between the engine and the other microphone (a ratio of a shorter distance to a longer distance) is increased, a difference distance between the two microphones regarding the engine sound produced by the user's vehicle can be increased, which makes it possible to easily set such a threshold value. Still further, it is also possible to easily set such a threshold value by increasing a difference distance between the microphones regarding the engine sound produced by the user's vehicle, when a hood of the user's vehicle is made of various materials so that there are different materials having different density or different shapes between the engine and the respective microphones.

Referring back to the flowchart of FIG. 14, next, each of the microphones 102a to 102n receives a mixed sound including the engine sound 101a produced by the user's vehicle (sound to be removed from the mixed sound) and the engine sound 101b produced by the motorcycle (sound to be extracted from the mixed sound) (Step S902).

Then, the analysis unit 103 analyzes a frequency of the mixed sound which each of the microphones 102a to 102n receives, and then generates frequency signals corresponding to each of the microphones (Step S903). Here, it is assumed that the frequency signals are generated from a mixed sound having a sampled frequency 44.1 kHz for each of the microphones, in a frequency band per 20 Hz ranging from 0 Hz to 2000 Hz and with a window length of discrete Fourier's transformation of 128 points.

Then, the extraction unit 105 adjusts a time axis of the frequency signals which are analyzed by the analysis unit 103, so that a reaching time difference among the microphones 102a to 102n becomes 0 (in other words, there is no time difference between when the engine sound 101b produced by the motorcycle (sound to be extracted) travels in a candidate source direction and reaches one of the microphones 102a to 102n and when the engine sound 101b produced by the motorcycle travels in the candidate source direction and reaches another). In addition, from the frequency signals with the time axis having been adjusted, the extraction unit 105 removes a part of the frequency signals having a difference distance among the microphones that is greater than the threshold value 104. Then, from the frequency signals from which the above part has been removed, the extraction unit 105 extracts a source direction of the engine sound 101b produced by the motorcycle (Step 904).

FIG. 21 shows frequency signals in a frequency band of 800 Hz of mixed sounds which the microphone A and the microphone B receive respectively. Here, a time axis of the frequency signals regarding each of the microphones is adjusted so that a reaching time difference between the microphones A and B becomes 0 (in other words, there is no time difference between when the mixed sound travels in a candidate source direction (50 degrees) and reaches the microphone A and when the mixed sound travels in the candidate source direction (50 degrees) and reaches the microphone B).

In FIG. 21, each dotted line represents frequency signals regarding the microphone A, and each solid line represents frequency signals regarding the microphone B. A horizontal axis is a time axis, and a vertical axis is a frequency axis. In this figure, since the frequency signals are complex signals, a real part and an imaginary part of the frequency signals are plotted by separate graphs.

The following describes one example of calculating of a difference distance. In this example, the "difference distance" means a ratio of a partial time period 300 to a whole time period (a predetermined time duration) shown in FIG. 21. In each partial time period 300, a difference value between frequency signals regarding the microphone A and frequency signals regarding the microphone B is greater than a predetermined value. It should be noted that the predetermined value has been determined experimentally. It should be noted that the difference value is a value normalized using a size of an amplitude. For example, regarding a degree of distortion of an amplitude value, the larger the amplitude value is, the larger an absolute amount of the distorted amplitude value becomes. For example, if a sound pressure sensitivity level is attenuated into a half, when an amplitude value not yet attenuated is 10, an attenuated amplitude value becomes 5. Therefore, a difference between the amplitude values becomes 5. Furthermore, when an amplitude value not yet attenuated is 2, an attenuated amplitude value becomes 1. Therefore, a difference between the amplitude values becomes 1. As explained above, the larger the amplitude value is, the larger an absolute amount of the distorted amplitude value becomes. Therefore, it is considered that influence of a size of amplitude can be removed by using a difference value normalized using a size of frequency signals. In this example, the "difference value" is determined by the below equation. Thereby, since the difference distance does not depend on a sound pressure sensitivity level, it is possible to easily set such a threshold value both for an extraction sound having a high sound pressure sensitivity level and an extraction sound having a low sound pressure sensitivity level.

$$\frac{\sqrt{(x_A - x_B)^2 + (y_A - y_B)^2}}{\sqrt{\left(\frac{x_A + x_B}{2}\right)^2 + \left(\frac{y_A + y_B}{2}\right)^2}} \quad \text{[Equation 1]}$$

The difference value is normalized using a mean value of power spectrums of frequency signals of the microphone A and the microphone B. Therefore, it is possible to set a threshold value without depending on a size of a sound pressure sensitivity level of a frequency to be analyzed. Here, $x_A$ and $y_A$ represent values of a real part and an imaginary part, respectively, of frequency signals regarding the microphone A at a certain time, and $x_B$ and $y_B$ represent values of a real part and an imaginary part, respectively, of frequency signals regarding the microphone B at the certain time. Furthermore, in this example, the predetermined value is 0.5 and the threshold value 104 is 30%. Since the difference value is normalized using a size of a power spectrum, the size of the power spectrum for a frequency band does not need to be considered. Therefore, the predetermined value is assumed to be the same in all frequency bands. The partial time period 300 enclosed by the broken line of FIG. 21 shows frequency signals having a difference value greater than the predetermined value. As shown in FIG. 21, it is understood that a ratio of (i) the partial time period 300 enclosed by the broken line to (ii) a whose time period is large in the case where a time axis of the frequency signals is adjusted assuming that a source location exists in a direction of +50 degrees. In the case where this ratio which is the difference distance is greater than 30% which is the threshold value 104, frequency signals during the whole certain time period are removed to determine a direction of the sound source. In this case, it is considered that there is no sound source to be extracted in a direction of +50 degrees, regarding a frequency band of 800 Hz.

Figure 22:
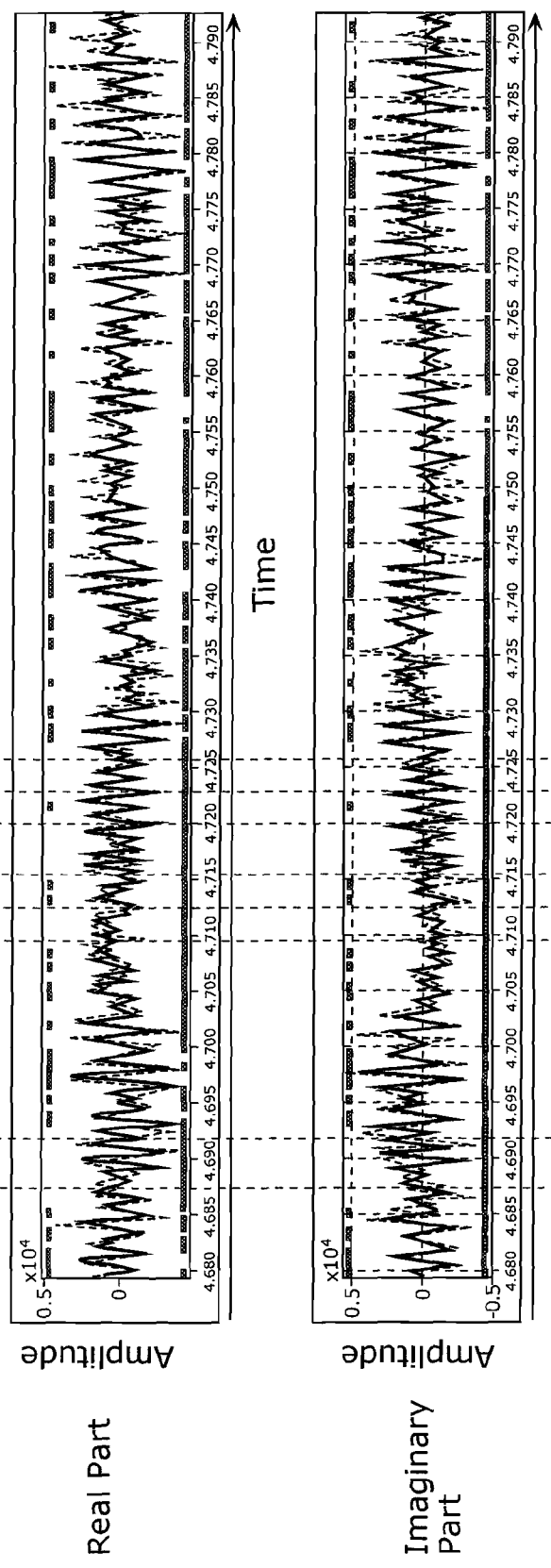
FIG. 22 shows graphs of one example of the frequency signals of the mixed sound.

FIG. 22 shows frequency signals in a frequency band of 800 Hz of mixed sounds which the microphone A and the microphone B receive respectively. Here, a time axis of the frequency signals regarding each of the microphones is adjusted so that a reaching time difference between the microphones A and B becomes 0 regarding another candidate source direction (−30 degrees) (in other words, there is no time difference between when the mixed sound travels in a different candidate source direction (−30 degrees) and reaches the microphone A and when the mixed sound travels in the different candidate source direction (−30 degrees) and reaches the microphone B).

In FIG. 22, each dotted line represents frequency signals regarding the microphone A, and each solid line represents frequency signals regarding the microphone B. A horizontal axis is a time axis, and a vertical axis is a frequency axis. In this figure, since the frequency signals are complex signals, a real part and an imaginary part of the frequency signals are plotted by separate graphs.

In FIG. 22, a difference distance is calculated using the same definition as described above, during the same certain time period (predetermined time duration) as the time period shown in FIG. 21. A partial time period 302 enclosed by the broken line of FIG. 22 shows frequency signals having a difference value greater than the predetermined value. As shown in FIG. 22, it is understood that a ratio of (i) the partial time period 302 enclosed by the broken line to (ii) the certain time period including the partial time period is large in the case where a time axis of the frequency signals is adjusted assuming that a source location exists in a direction of −30 degrees. In the case where this ratio which is the difference distance is greater than 30% which is the threshold value 104, frequency signals during the whole certain time period are not removed to determine a direction of the sound source. In this example, when the source direction is detected, it is judged that the sound source to be extracted exists in a direction of −30 degrees for a frequency band of 800 Hz, in the case where a correlation value (matching degree) among the microphones regarding a part having a difference value smaller than the predetermined value at each timing in the certain time period is a maximum value among cross-correlation values of all source directions (angles) which are not removed but remain. For example, assuming that, for a frequency band of 800 Hz, candidates of −30 degrees, −40 degrees, and −50 degrees are remained as candidates for the source direction, a source direction candidate corresponding to a maximum cross-correlation value among cross-correlation values of the respective candidates is determined as a source direction of the extraction sound. Here, it is also possible to determine, as the source direction of the extraction sound, a source direction candidate corresponding to a cross-correlation value greater than the second predetermined threshold value. The above case can be used to detect directions of a plurality of sound sources. It is further possible to determine, as the source direction of the extraction sound, a source direction candidate corresponding to a cross-correlation value that has a maximum value for an axis of the source direction. Furthermore, it is possible to determine, as source directions, all directions having difference distances that is equal to or smaller than a threshold value, as a different matching degree. It is further possible to determine, as a source direction, a direction having a minimum or a relative minimum direction.

Each of FIGS. 23A, 23B, 25A, 25B, 27A, and 27B shows a histogram of a source direction detected from one hundred of frequency bands included in a range from 0 Hz to 2000 Hz.

Figure 23A:
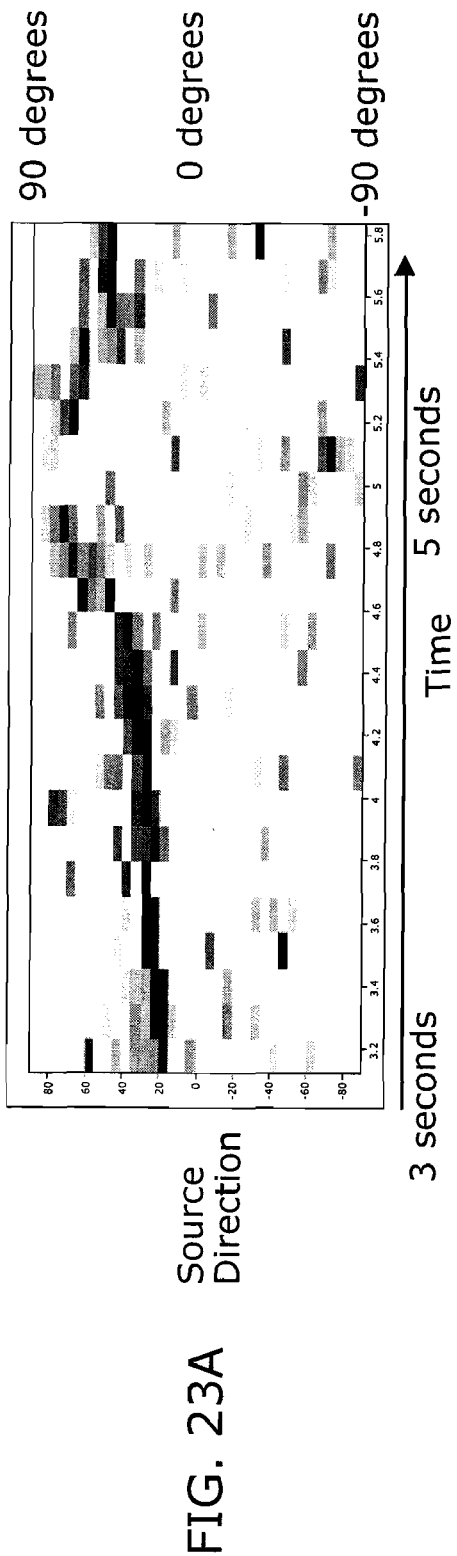
FIG. 23A is a graph showing one example of a result of extracting source directions using a mixed sound.
Figure 23B:
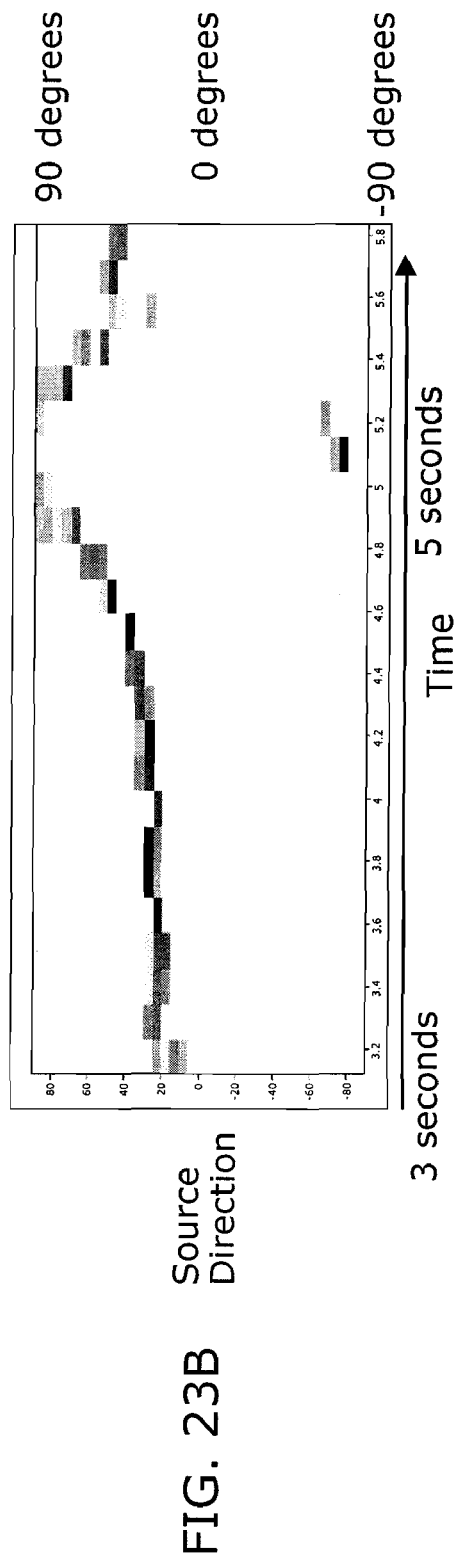
FIG. 23B is a graph showing one example of a result of extracting a source direction using the mixed sound.
Figure 24A:
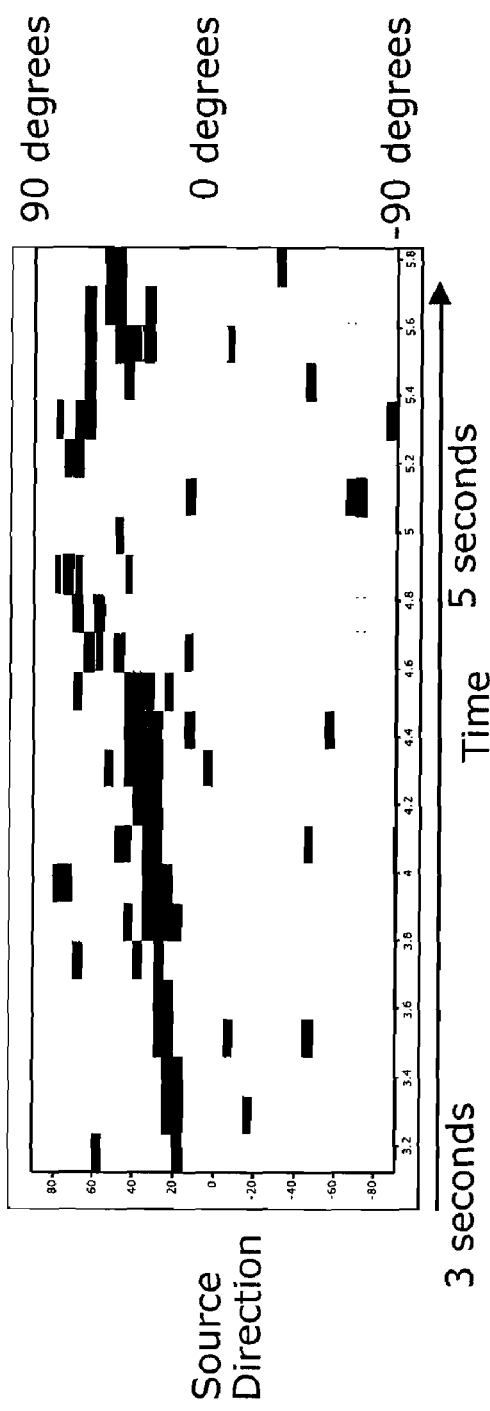
FIG. 24A is a graph showing values of shading in the graph of FIG. 23A as binarized data.
Figure 24B:
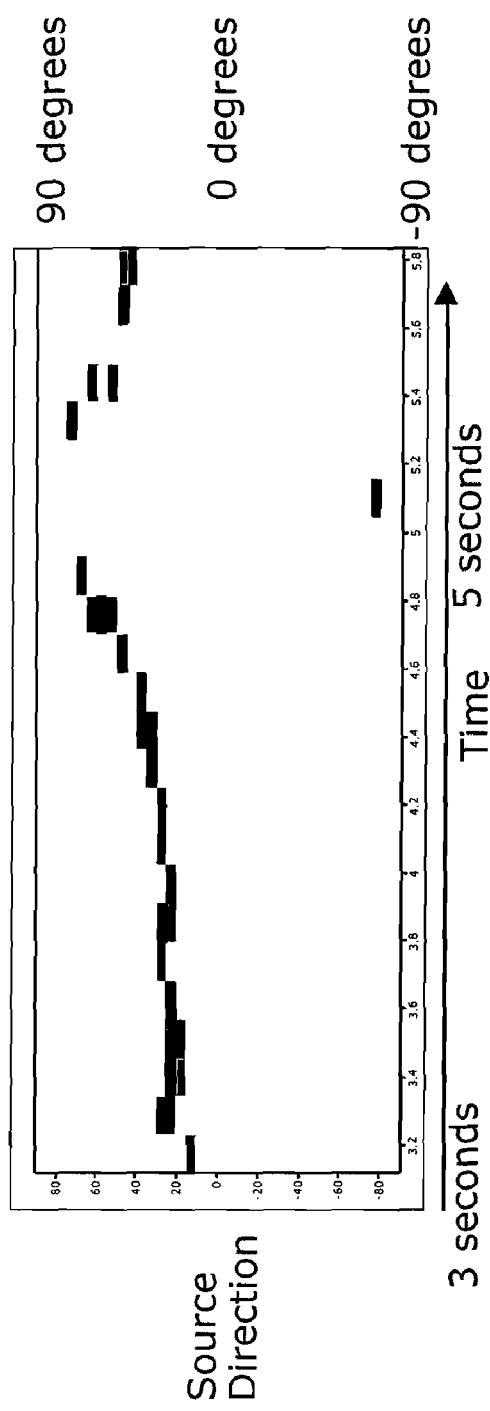
FIG. 24B is a graph showing values of shading in the graph of FIG. 23B as binarized data.
Figure 25A:
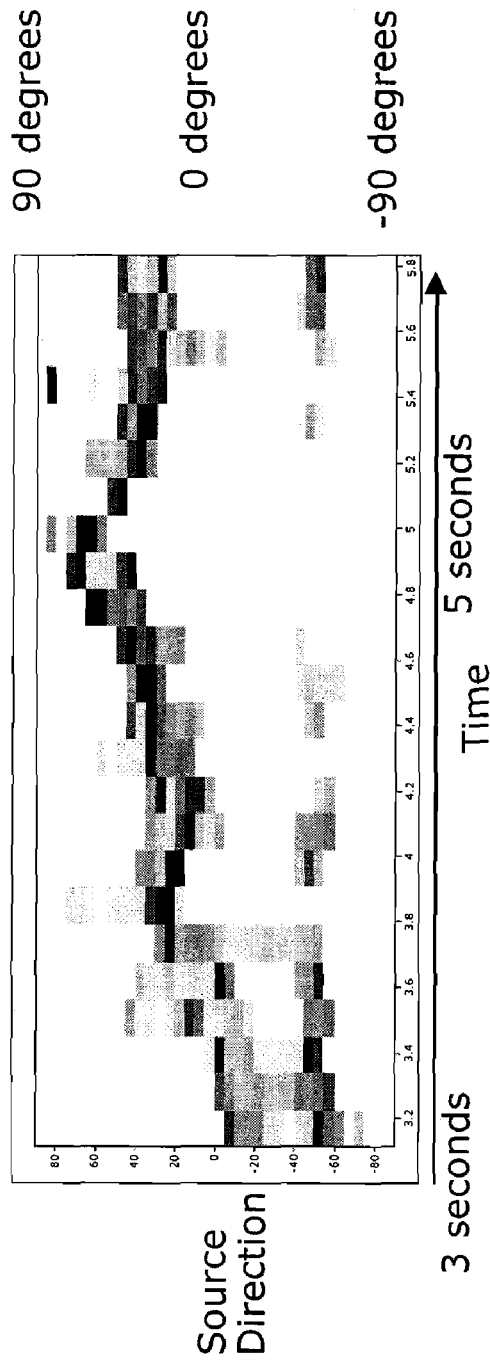
FIG. 25A is a graph showing one example of a result of extracting a source direction using a mixed sound.
Figure 25B:
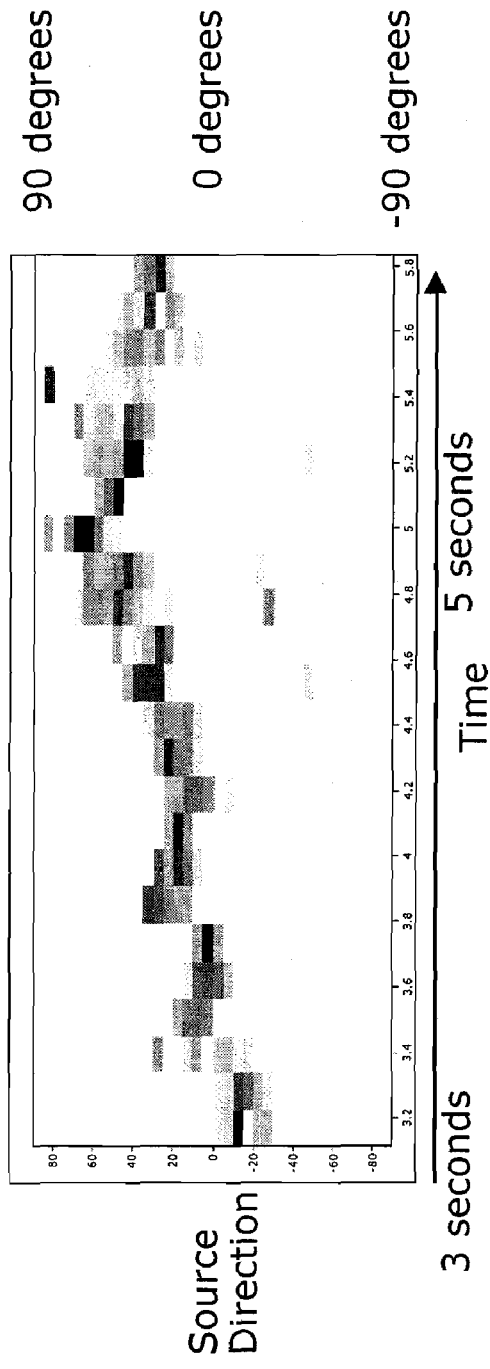
FIG. 25B is a graph showing one example of a result of extracting a source direction using the mixed sound.
Figure 26A:
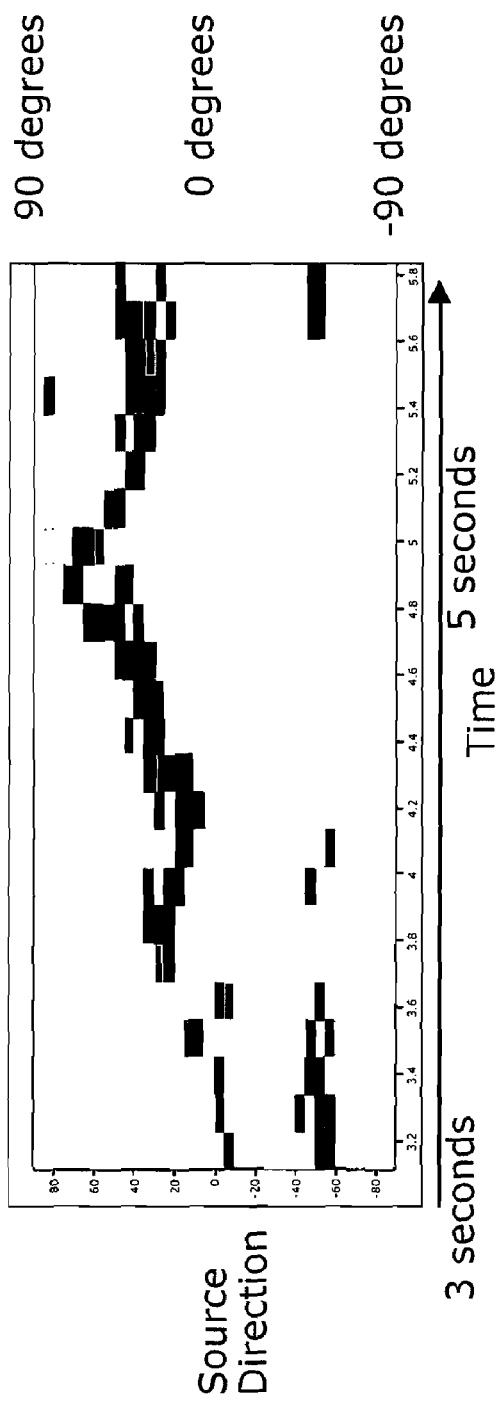
FIG. 26A is a graph showing values of shading in the graph of FIG. 25A as binarized data.
Figure 26B:
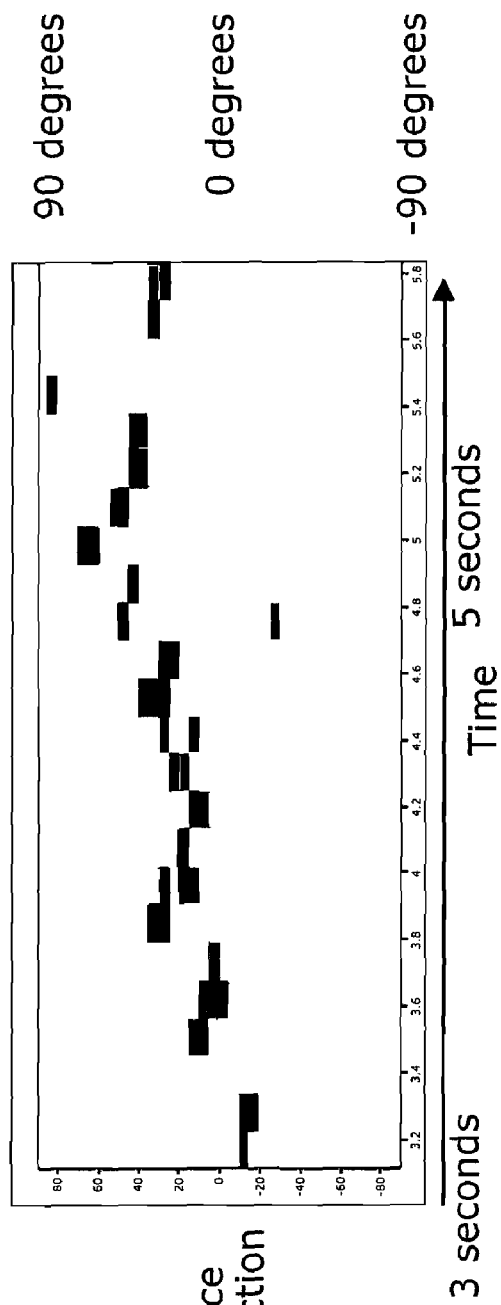
FIG. 26B is a graph showing values of shading in the graph of FIG. 25B as binarized data.
Figure 27A:
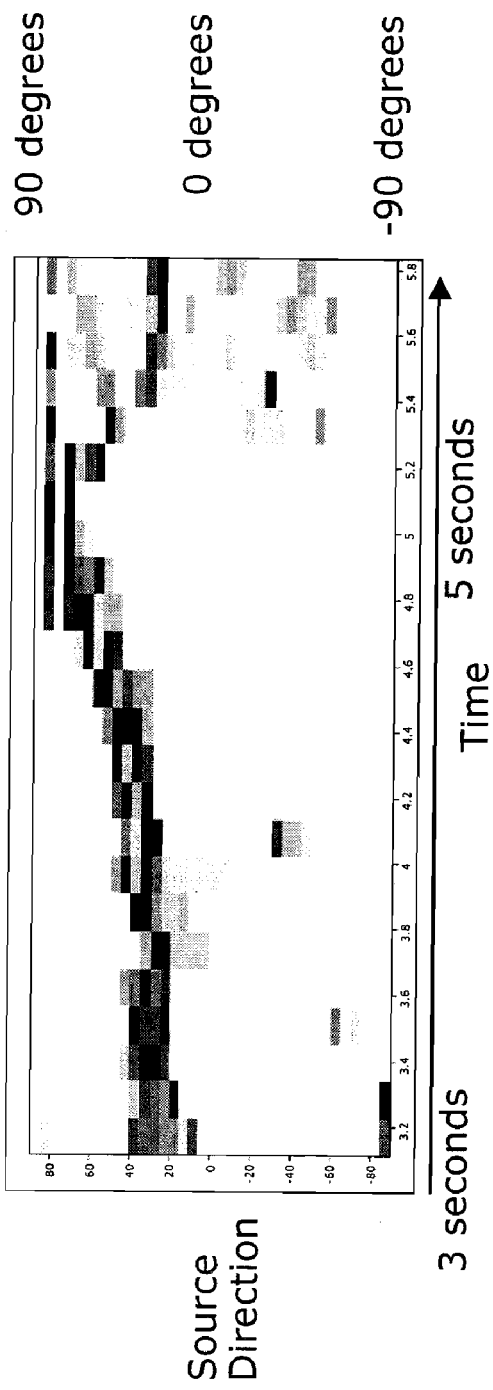
FIG. 27A is a graph showing one example of a result of extracting a source direction using a mixed sound.
Figure 27B:
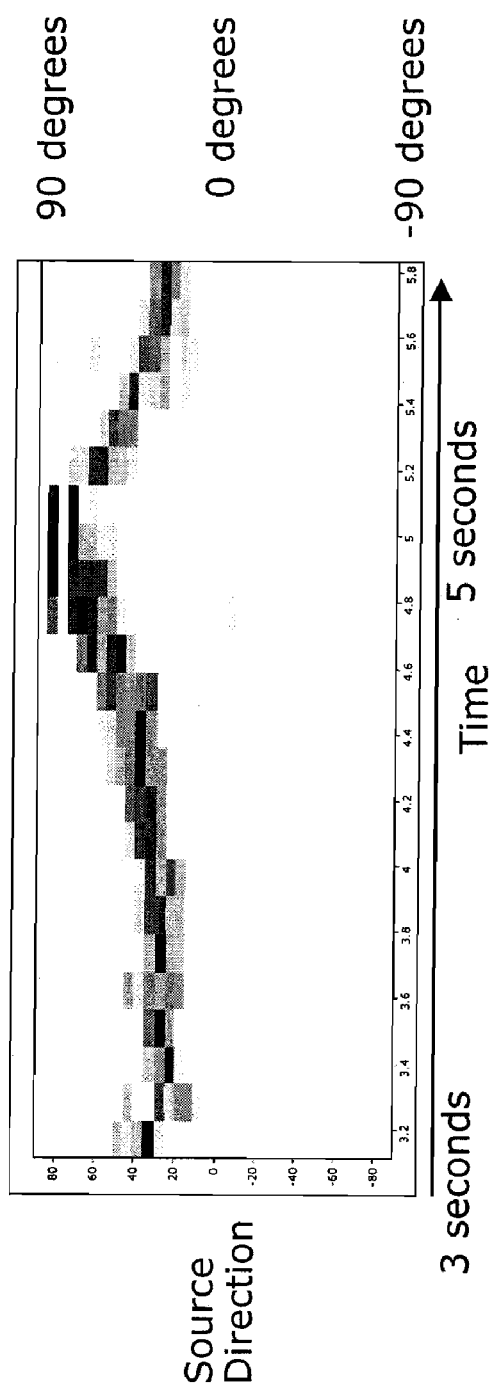
FIG. 27B is a graph showing one example of a result of extracting a source direction using the mixed sound.

The source direction is detected by the conventional method or by the method according to the present invention. Each of FIG. 23A and FIG. 23B shows a result regarding the microphones A and D. Each of FIG. 25A and FIG. 25B shows a result regarding the microphones A and B. Each of FIG. 27A and FIG. 27B shows a result regarding the microphones C and D.

A horizontal axis is a time axis, and a vertical axis represents a source direction. Shading of color represents a degree, and a darker color part represents a larger degree. Each of FIGS. 23A, 25A, and 27A shows a result of extracting a source direction using both of (i) a part of frequency signals that is greater than a threshold value and (ii) a part of frequency signals that is smaller than the threshold value (in other words, without using any threshold value) in the prior art. On the other hand, each of FIGS. 23B, 25B, and 27B shows a result of extracting a source direction using only frequency signals from which a part greater than a threshold value is removed (in other words, using a threshold value) according to the present invention. For the sake of easy understanding of the graphs, FIGS. 24A, 24B, 26A, 26B, 28A, and 28B show binarized data of values of shading in the graphs of FIGS. 23A, 23B, 25A, 25B, 27A, and 27B, respectively.

FIG. 29 is a schematic diagram showing a source location of the engine sound 101b produced by the motorcycle according to a time. The source direction detected from the microphone A and the microphone B at around a time at which 3 seconds has passed has about 0 degree (a source direction detected from the microphone C and the microphone D is a direction of about +30 degrees), the source direction detected from the microphone A and the microphone B at around a time at which 5 seconds has passed has about 90 degrees, then afterwards the source direction is changed to have 0 degree.

Each of FIGS. 15A, 17A, and 19A shows a source direction of the engine sound 101a (idling sound) produced by the user's vehicle. From the results of FIGS. 23B, 25B, and 27B, it is understood that, by performing the processing using a threshold value which is characterized in the present invention, the source direction of the engine sound 101a produced by the user's vehicle is removed and a source direction of the engine sound 101b produced by the motorcycle can be extracted. Moreover, from FIGS. 19A and 27B, it is understood that, even when the source direction of the engine sound produced by the user's vehicle is overlapped with the source direction of the engine sound 101b produced by the motorcycle, the influence of the engine sound produced by the user's vehicle can be removed.

Thus, the present invention can distinguish a noise to be removed over an extraction sound to be extracted, by comparing a difference distance with a threshold value to determined a size of the difference distance. Therefore, parts of frequency signals corresponding to the noise can be selectively removed from frequency signals of a mixed sound which each of microphones receives. Thereby, the present invention can accurately detect a source direction of the extraction sound by removing influence of the noise. Especially, the present invention has significant advantages of removing influence of an engine sound produced by a user's vehicle, because the influence of the engine sound causes a problem when microphones on the user's vehicle operate to achieve the detecting.

It should be noted that it has been described in the above embodiment that the difference distance is a ratio of (i) a partial time period having a difference value of an amplitude value of frequency signals that is greater than a predetermined value to (ii) a certain time period (a predetermined time duration). However, the difference distance may be defined as a difference value in vectors between the microphones, when a temporally-continuous amplitude shape is expressed as a vector during the certain time period (the predetermined time duration). Even in this case, the difference distance is calculated for a certain time period (predetermined time duration). Therefore, it is possible to remove a part where amplitude values of frequency signals are the same between the microphones during a short time period by coincidence. It should also be noted that the difference distance in a complex spectrum space has been described to be used, but a difference distance of a power spectrum or a phase spectrum may be also used.

As described above, by calculating a difference distance for each certain time period (a predetermined time duration), it is possible to remove a part where amplitude values of frequency signals are the same between the microphones during a short time period by coincidence. In addition, it is also possible to remove influence of distortion of the amplitude values resulting from mixing of a plurality of sounds.

Moreover, it is suggested that using of a difference distance normalized using a mean value of power spectrums of frequency signals between the microphones is advantageous. This is because, since the motorcycle moves, when the motorcycle is far from the user's vehicle, a sound pressure sensitivity level becomes low, and when the motorcycle approaches the user's vehicle, a sound pressure sensitivity level becomes high.

It should also be noted that a source location can be determined using triangular surveying based on (i) an extraction result from the microphone A and the microphone B, and (ii) an extraction result from the microphone C and the microphone D. It should also be noted that a source location can be determined directly by adjusting a reaching time difference regarding when reaching from a candidate source location to each of the microphones, and then comparing a degree by which the reaching time differences match together.

As described above, the present invention can distinguish a noise to be removed over an extraction sound to be extracted, by comparing a difference distance among the microphones with a threshold value to determine a size of the difference distance. Therefore, parts of frequency signals corresponding to the noise can be selectively removed from frequency signals of the mixed sound which microphones receive. As a result, the present invention can detect a source direction of the extraction sound by removing influence of the noise. Especially, the present invention has significant advantages of removing influence of an engine sound produced by the user's vehicle, because the influence of the engine sound causes a problem when the microphones on the user's vehicle operate to achieve the detecting.

It should also be note that the threshold value 104 may be further adjusted based on a result of the extraction unit 105 (a degree of removing of the source direction of the engine sound 101a produced by the user's vehicle, an extraction degree of a source direction of the engine sound 101b produced by the motorcycle, for example).

It should also be noted that, since a background noise and a wind nose are considered to have different frequency signals among the microphones, it is thought that these noise can be removed as noises. It should be noted that, even if the microphones receive different sounds, respectively, since the frequency signals are different among the microphones, these sounds can be removed as noises, which makes it possible to prevent to output an error source direction and an error source location.

INDUSTRIAL APPLICABILITY

The sound source localization device according to the present invention is highly suitable for practical use, being used as a wide variety products such as: a safe driving supporting device which detects an approaching vehicle by sounds (by removing influence of an engine sound of a user's vehicle, for example); a security camera which automatically focuses a source location of a sound (by removing influence of a motor sound of the camera); and a TV conference device which can collect sounds by setting a directivity to a speaker (by removing influence of utterances of other participants in a TV conference).

The invention claimed is:

1. A sound source localization device which detects, from a mixed sound including a noise, a source direction or a source location of an extraction sound to be extracted from the mixed sound, said sound source localization device comprising:
   an analysis unit structurally arranged to (i) analyze frequencies of the mixed sound including the noise, the mixed sound being received by each of a plurality of microphones which are arranged apart from each other and (ii) generate frequency signals corresponding to the plurality of microphones; and
   an extraction unit structurally arranged to:
      (i) for each of a plurality of candidates for the source direction or the source location of the extraction sound, (a) adjust time axes of the frequency signals corresponding to the plurality of microphones so that there is no time difference between when the mixed sound reaches one of the plurality of microphones from the candidate for the source direction or the source location and when the mixed sound reaches another one of the plurality of microphones from the candidate for the source direction or the source location, and (b) determine frequency signals between the plurality of microphones having a difference distance equal to or smaller than a threshold value, from among the frequency signals corresponding to the plurality of microphones with the time axis having been adjusted, the difference distance representing a degree of a difference in the frequency signals between the plurality of microphones; and
      (ii) extract the source direction or the source location of the extraction sound from among the plurality of candidates for the source direction or the source location, in accordance with a degree of matching of the determined frequency signals between the plurality of microphones,
   wherein the threshold value is set so that (i) a difference distance regarding frequency signals generated by analyzing a frequency of the extraction sound is equal to or smaller than the threshold value and (ii) a difference distance regarding frequency signals generated by analyzing a frequency of a predetermined noise, which is included in the noise and is to be removed, is greater than threshold value.

2. The sound source localization device according to claim 1,
   wherein the plurality of microphones are arranged so that a first ratio is greater than a second ratio,
   wherein the first ratio is calculated by dividing a first distance by a second distance, the first distance and the second distance being from among distances between a source location of the noise and the respective plurality of microphones such that the first distance is longer than the second distance, and
   wherein the second ratio is calculated by dividing a third distance by a fourth distance, the third distance and the fourth distance being from among distances between the source location of the extraction sound and the respective plurality of microphones such that the third distance is longer than the fourth distance.

3. The sound source localization device according to claim 1,
   wherein a part of a transmission medium through which the noise propagates to a corresponding one of the plurality of microphones is made of a material having a transmission characteristic which is different for each of the plurality of microphones.

4. The sound source localization device according to claim 1,
   wherein the difference distance represents a degree of a difference in power spectrums of the frequency signals between the plurality of microphones.

5. The sound source localization device according to claim 1,
   wherein the difference distance is calculated for a predetermined time duration.

6. The sound source localization device according to claim 1,
   wherein the frequency signals between the plurality of microphones are normalized using an average value of power spectrums of the frequency signals corresponding to the plurality of microphones.

7. A sound source localization device which detects, from a mixed sound including a noise produced by a user's vehicle, a source direction or a source location of a sound produced by a vehicle near the user's vehicle, said sound source localization device comprising:
   an analysis unit structurally arranged to (i) analyze frequencies of the mixed sound including the noise, the mixed sound being received by each of a plurality of microphones which are arranged apart from each other in the user's vehicle and (ii) generate frequency signals corresponding to the plurality of microphones; and,
   an extraction unit structurally arranged to:
      (i) for each of a plurality of candidates for the source direction or the source location of the sound produced by the vehicle near the user's vehicle, (a) adjust time axes of the frequency signals corresponding to the plurality of microphones so that there is no time difference between when the mixed sound reaches one of the plurality of microphones from the candidate for the source direction or the source location and when the mixed sound reaches another one of the plurality of microphones from the candidate for the source direction or the source location, and (b) determine frequency signals between the plurality of microphones having a difference distance equal to or smaller than a threshold value, from among the frequency signals corresponding to the plurality of microphones with the time axis having been adjusted, the difference distance representing a degree of a difference in the frequency signals between the plurality of microphones; and
      (ii) extract the source direction or the source location of the extraction sound from among the plurality of candidates for the source direction or the source location, in accordance with a degree of matching of the determined frequency signals between the plurality of microphones,
   wherein the threshold value is set so that (i) a difference distance regarding frequency signals generated by analyzing a frequency of the extraction sound is equal to or smaller than the threshold value and (ii) a difference distance regarding frequency signals generated by analyzing a frequency of a predetermined noise, which is included in the noise and is to be removed, is greater than threshold value.

8. A sound source localization method of detecting, from a mixed sound including a noise, a source direction or a source location of an extraction sound to be extracted from the mixed sound, said sound source localization method comprising:

analyzing frequencies of the mixed sound including the noise, the mixed sound being received by each of a plurality of microphones which are arranged apart from each other;

generating frequency signals corresponding to the plurality of microphones;

for each of a plurality of candidates for the source direction or the source location, (a) adjusting time axes of the frequency signals corresponding to the plurality of microphones so that there is no time difference between when the mixed sound reaches one of the plurality of microphones from the candidate for the source direction or the source location and when the mixed sound reaches another one of the plurality of microphones from the candidate for the source direction or the source location, and (b) determining frequency signals between the plurality of microphones having a difference distance equal to or smaller than a threshold value, from among the frequency signals corresponding to the plurality of microphones with the time axis having been adjusted, the difference distance representing a degree of a difference in the frequency signals between the plurality of microphones; and extracting the source direction or the source location of the extraction sound from among the plurality of candidates for the source direction or the source location, in accordance with a degree of matching of the determined frequency signals between the plurality of microphones, wherein the threshold value is set so that (i) a difference distance regarding frequency signals generated by analyzing a frequency of the extraction sound is equal to or smaller than the threshold value and (ii) a difference distance regarding frequency signals generated by analyzing a frequency of a predetermined noise, which is included in the noise and is to be removed, is greater than threshold value.

9. A non-transitory computer-readable recording medium having stored thereon a program for detecting, from a mixed sound including a noise, a source direction or a source location of an extraction sound to be extracted from the mixed sound, wherein said program causes a computer to perform a method comprising:

analyzing frequencies of the mixed sound including the noise, the mixed sound being received by each of a plurality of microphones which are arranged apart from each other;

generating frequency signals corresponding to the plurality of microphones;

for each of a plurality of candidates for the source direction or the source location, (a) adjusting time axes of the frequency signals corresponding to the plurality of microphones so that there is no time difference between when the mixed sound reaches one of the plurality of microphones from the candidate for the source direction or the source location and when the mixed sound reaches another one of the plurality of microphones from the candidate for the source direction or the source location, and (b) determining frequency signals between the plurality of microphones having a difference distance equal to or smaller than a threshold value, from among the frequency signals corresponding to the plurality of microphones with the time axis having been adjusted, the difference distance representing a degree of a difference in the frequency signals between the plurality of microphones; and extracting the source direction or the source location of the extraction sound from among the plurality of candidates for the source direction or the source location, in accordance with a degree of matching of the determined frequency signals between the plurality of microphones, wherein the threshold value is set so that (i) a difference distance regarding frequency signals generated by analyzing a frequency of the extraction sound is equal to or smaller than the threshold value and (ii) a difference distance regarding frequency signals generated by analyzing a frequency of a predetermined noise, which is included in the noise and is to be removed, is greater than threshold value.

* * * * *